(12) United States Patent
Vodopyanov et al.

(10) Patent No.: US 7,035,298 B2
(45) Date of Patent: Apr. 25, 2006

(54) FREQUENCY CONVERSION EFFICIENCY

(75) Inventors: Konstantin Vodopyanov, San Jose, CA (US); Bruce Richman, Sunnyvale, CA (US); Chris Rella, Sunnyvale, CA (US)

(73) Assignee: Picarro, Inc., Sunnyvale, CA (US)

( * ) Notice: Subject to any disclaimer, the term of this patent is extended or adjusted under 35 U.S.C. 154(b) by 42 days.

(21) Appl. No.: 10/910,121

(22) Filed: Aug. 3, 2004

(65) Prior Publication Data
US 2005/0008046 A1   Jan. 13, 2005

Related U.S. Application Data

(63) Continuation-in-part of application No. 10/349,379, filed on Jan. 21, 2003, now abandoned, and a continuation-in-part of application No. 10/869,623, filed on Jun. 16, 2004.

(51) Int. Cl.
*H01S 3/10* (2006.01)
(52) U.S. Cl. .......................................... 372/22; 359/328
(58) Field of Classification Search ................ 372/21, 372/22; 359/326, 328
See application file for complete search history.

(56) References Cited

U.S. PATENT DOCUMENTS

| | | | |
|---|---|---|---|
| 3,950,103 A * | 4/1976 | Schmidt-Weinmar | ....... 356/450 |
| 5,289,491 A | 2/1994 | Dixon | |
| 5,321,718 A * | 6/1994 | Waarts et al. | ................ 372/108 |
| 5,450,429 A * | 9/1995 | Klemer et al. | ................. 372/22 |
| 5,648,866 A * | 7/1997 | Trebino et al. | ............. 359/326 |

OTHER PUBLICATIONS

Parametric Interaction of Focused Gaussian Light Beams Boyd et.al., Jnl. Applied Physics vol. 39, No. 8, Jul. 1968.

* cited by examiner

*Primary Examiner*—Minsun Oh Harvey
*Assistant Examiner*—James Menefee
(74) *Attorney, Agent, or Firm*—Lumen Intellectual Property Services, Inc.

(57) ABSTRACT

Improved multipass second harmonic generation (SHG) is provided by the use of an inverting, self-imaging telescope which ensures parallelism of all passes of all beams within the nonlinear medium. Improved multipass SHG is also provided by the use of a wedged phasor which provides a simple adjustment of the relative phase of the pump beam and second harmonic beam between passes. Improved multipass SHG is provided by the use of an inverting self-imaging telescope in combination with a wedged phasor which provides a simple adjustment of the relative phase of the pump beam and second harmonic beam between passes, ensures parallelism of all passes of all beams within the nonlinear medium. A further embodiment includes an OPO and at least one phasor and preferably first and second telescope assemblies.

31 Claims, 6 Drawing Sheets

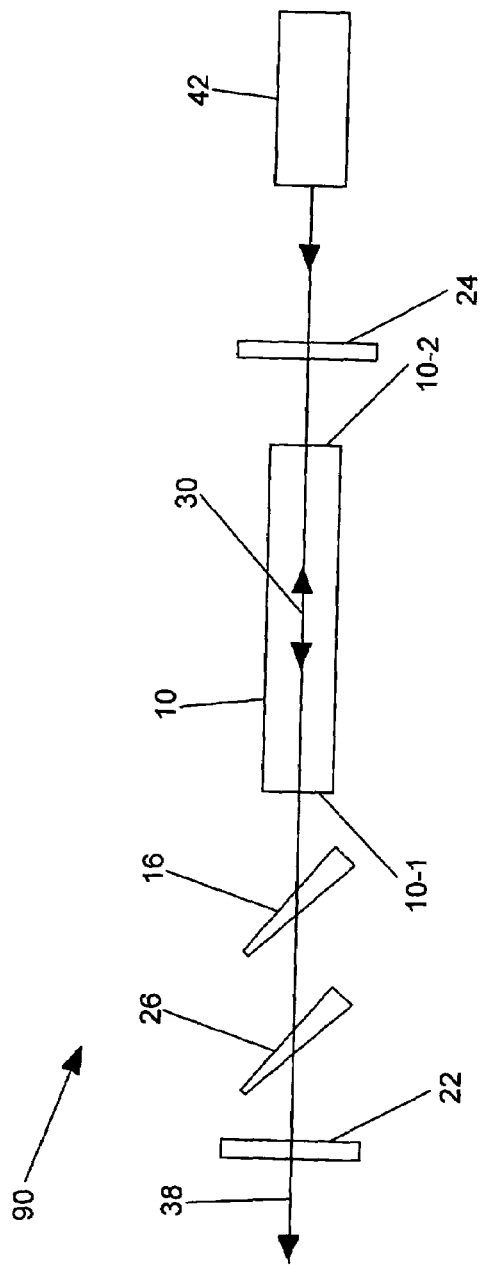
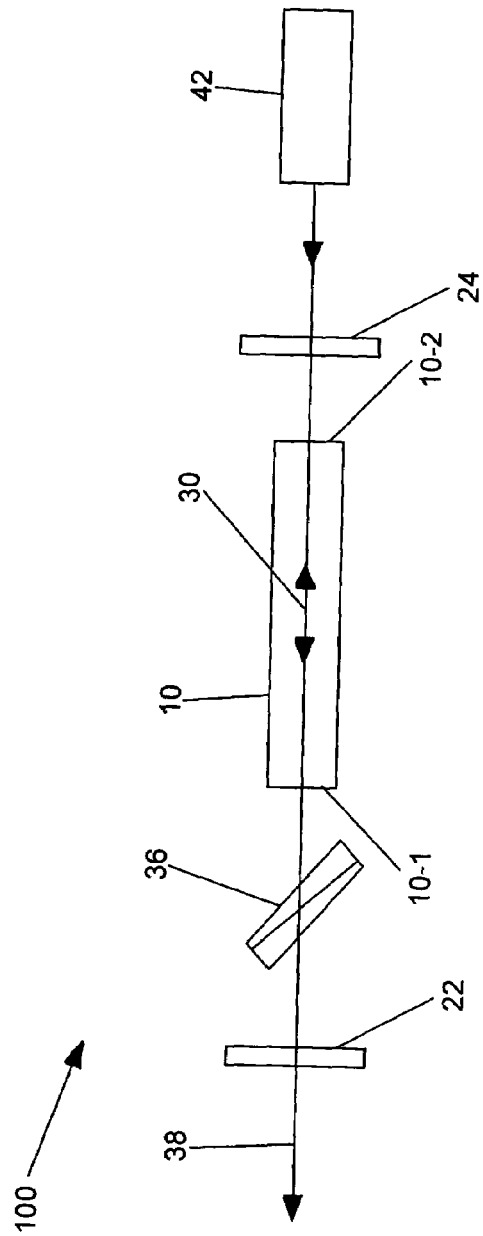

FREQUENCY CONVERSION EFFICIENCY

CROSS-REFERENCE TO RELATED APPLICATIONS

This application is a continuation-in-part of application Ser. No. 10/349,379, filed Jan. 21, 2003; and Ser. No. 10/869,623 filed Jun. 16, 2004; the disclosures of which are incorporated herein by reference.

FIELD OF THE INVENTION

This invention relates to nonlinear optics, and more specifically to apparatus and methods for the frequency conversion of laser light.

BACKGROUND OF THE INVENTION

Existing laser sources do not provide adequate coverage of the entire optical spectrum. Consequently, there has evolved a variety of techniques for obtaining laser light having a wavelength different from that directly emitted by an available laser. Techniques are known to double the frequency of a laser, to sum or difference the frequency of two different lasers to produce a third frequency, or to parametrically generate a new frequency. The energy conversion efficiency of most commercially available frequency conversion systems is typically less than 50%. Therefore, it would be advantageous to provide a technique which will improve the frequency conversion efficiency of second harmonic generation (SHG), sum frequency generation (SFG), difference frequency generation (DFG) optical parametric oscillation (OPO), and optical parametric amplification (OPA). Note that as used herein, these acronyms are used to denote either the technique or the apparatus for implementing the technique as the context requires, e.g., OPO will denote either an optical parametric oscillator apparatus or the technique of frequency conversion using an optical parametric oscillator. Such devices are described in U.S. Pat. Nos. 3,262,058, 3,328,723 and 3,747,022.

All of the above-indicated frequency conversion techniques, i.e., SHG, SFG, DFG, OPO and OPA have, as a common factor, the use of at least one nonlinear crystal to effect frequency conversion. Additionally, all of these techniques embody a three-wave, three-frequency mixing process such that the optical frequency of one optical wave equals the sum of the optical frequencies of the other two optical waves:

$$\omega_1 + \omega_2 = \omega_3.$$

In addition, for all of the techniques, the change of the optical powers obey the Manley-Rowe relations, which describe the conservation of photons, $$\Delta P_1/\omega_1 = \Delta P_2/\omega_2 = -\Delta P_3/\omega_3,$$

where $\Delta P_i$ is the change in power of wave, i, caused by the nonlinear conversion process. The techniques differ, however, in which waves are input to the nonlinear crystal, and which waves are generated within the nonlinear crystal.

SFG is the process by which two input waves, at respective frequencies $\omega_1$ and $\omega_2$, generate a wave of frequency, $\omega_3$, which is equal to the sum of $\omega_1$ and $\omega_2$. Both inputs are depleted as the sum wave (frequency $\omega_3$) is generated.

SHG is a degenerate case of SFG in which $\omega_1 = \omega_2$, so that $\omega_3 = 2\omega_1$.

DFG is the process by which two input waves, at frequencies $\omega_3$ and $\omega_2$, where $\omega_3 > \omega_2$, generate a wave of frequency $\omega_1$ which is equal to $\omega_3$ minus $\omega_2$. As the difference wave at frequency $\omega_1$ is generated, the high-frequency input wave, (frequency $\omega_3$), is depleted, and the lower frequency input wave (frequency $\omega_2$), is amplified. DFG is essentially the reverse process of SFG. DFG is often considered to be a relatively low-efficiency process to distinguish it from OPA, which is described in the next paragraph. The power of the lower frequency input wave $\omega_2$ is used to generate wave $\omega_1$ at the difference frequency, i.e., $\Delta P_1/\omega_1 < P_2/\omega_2$, where $P_2$ is the power of the lower frequency input wave just prior to the nonlinear conversion.

OPA is substantially similar to DFG, except in the magnitude of the amplification of the low-frequency input wave. The OPA is assumed to have a high gain, and the amplified low-frequency input wave is used to generate yet more of the wave at the difference frequency, $\Delta P_1/\omega_1 = \Delta P_2/\omega_2 < P_2/\omega_2$. In practice, either or both of the difference output wave and the amplified low-frequency input wave may be utilized. Generally, the high-frequency input wave is called the "pump wave," the low-frequency input wave is called the "signal wave," and the difference output wave is called the "idler wave."

An OPO is an OPA within an optical resonator (resonant optical cavity), similarly as a laser is an optical gain medium within an optical resonator. An OPO utilizes a high-frequency input wave like an OPA, but it does not require a low-frequency input wave. In a singly-resonant OPO, the low-frequency wave grows from noise, as light does inside a laser, and circulates ("resonates") inside the optical resonator. The same conventions of naming the waves hold as for the OPA. The optical resonator has a set of discrete longitudinal modes for the resonated ("signal") wave, which determine the discrete frequencies that this signal wave may have. The spacing of these frequencies for the resonated signal wave equals the speed of light divided by the round-trip optical path length of the optical resonator for the signal wave. The optical path length is the integral of the refractive index along the physical beam path, i.e. nL for a physical length L and refractive index n. To vary the signal frequency continuously requires changing the optical path length of the optical resonator as measured at the signal wavelength. This can be accomplished, for example, by changing the physical length of the cavity by moving at least one of the mirrors of the optical resonator. By increasing the round-trip optical path of the resonator by one signal wavelength, the discrete frequencies permissible to the signal wave decrease by an amount equal to their spacing, without substantially changing their spacing.

In a doubly-resonant OPO, both of the signal and idler waves resonate inside the resonant optical cavity, and the frequency of the signal wave is restricted to the set of discrete frequencies determined by the optical path of the optical resonator at the signal wavelength, and the frequency of the idler wave is restricted to the set of discrete frequencies determined by the optical path of the optical resonator at the idler wavelength. Since the sum of the signal and idler wave frequencies is required to be equal to the frequency of the pump wave, as the signal frequency is increased, the idler frequency will decrease. However, increasing the physical length of the optical resonator will decrease the permissible discrete frequencies of both the signal and idler waves. In practice, as the physical length of a doubly-resonant OPO resonator is changed, the signal and idler waves attain significant power only at those resonator lengths for which a pair of permissible discrete signal and idler frequencies exists which sum to the pump frequency. These resonator lengths are themselves discrete, thus the signal and idler wave frequencies cannot be adjusted continuously. To adjust the signal and idler wave frequencies continuously, with a constant pump frequency, requires independent adjustment of the optical path of the resonator at the signal and idler wavelengths. A pump enhanced doubly-resonant OPO is sometimes referred to as a triply-resonant OPO.

More generally, for a nonlinear conversion process involving an arbitrary number of waves, the frequency relation is:

$$\sum_{i=1}^{M} S_i \omega_i = 0,$$

where $S_i=+1$ or $-1$, i denotes which one of the M beams, and there is at least one i for which $S_i=+1$ and at least one i for which $S_i=-1$, and all frequencies $\omega_i \geq 0$. $S_i$ is an abstraction to indicate whether the wave i is generated or amplified by the nonlinear mixing process ($S_i=+1$), or depleted by the process ($S_i=-1$). The Manley-Rowe relation is:

$S_i \Delta P_i/\omega_i = S_j \Delta P_j/\omega_j$, for all $1 \leq i,j \leq M$ where j denotes another beam.

The special case of SFG is defined by M=3, $S_1=S_2=-1$, and $S_3=+1$.

Examples of 4-wave mixing are Raman scattering, in which, usually, $S_1=S_3=+1$ and $S_2=S_4=-1$ and third-harmonic generation (THG) in which $S_1=S_2=S_3=-1$, $S_4=+1$, and $\omega_1=\omega_2=\omega_3$.

Occasionally, it is desirable to cascade nonlinear mixing processes. For example, generating the third-harmonic of a frequency $\omega_1$ by first SHG of $\omega_1$ and SPG of the resultant second-harmonic $\omega_3=2\omega_1$ with the original $\omega_1$ is sometimes more efficient than direct THG of $\omega_1$. In such cases, where multiple nonlinear mixing processes exist, each process m is described by its own frequency relation:

$$\sum_{i=1}^{M} S_{mi} \omega_i = 0.$$

Although in most descriptions of nonlinear optics only waves which are involved in the mixing process m are included in the equation for process m, here we include all waves M involved in any of processes m in each such equation, and assign $S_{mi}=0$ to those waves i not involved in mixing process m. Some of the $\omega_1$ may be shared among multiple nonlinear processes, with the same or different, non-zero values of $S_{mi}$ (i.e. +1 or -1) for each process m.

Increasing either the intensity of the laser source and/or increasing the nonlinear medium length, or both, can be used to achieve increased nonlinear conversion efficiency. The intensity can be increased by using a more powerful pump laser source and/or by focusing the beam more tightly into the nonlinear medium. There are however, practical limits to how much power a given laser source can produce. Focusing tightly has limited usefulness since diffraction effects cause the length of the focal region to decrease at the same rate as the intensity increases. Also, for some systems, the damage threshold intensity for the nonlinear medium is less than the intensity required for very high efficiency nonlinear interactions.

Another technique for increasing conversion efficiency is to increase the interaction length. In most high power frequency conversion techniques the nonlinear medium is a birefringent crystal that is cut at an angle such that the pump and generated frequency wave fronts maintain the phase-matching condition as they copropagate through the crystal. This technique can be applied to systems which are critically, noncritically, or quasi phase matched and can also be used for nonlinear frequency conversion processes such as frequency up conversion where one of the sources is a laser and the other source is incoherent radiation. However, the available length of these crystals is limited by the current state of the art of crystal manufacturing and in most cases is less, sometimes considerably less, than a few centimeters. Furthermore, for critical phase matching in birefringent crystals, beams of different frequency propagate through the crystal in different directions, a phenomenon referred to as "walk-off". Walk-off limits the effective interaction length to approximately the beam diameter divided by the walk-off angle. The efficiency achieved using single-pass nonlinear frequency conversion such as described in U.S. Pat. Nos. 5,644,584 and 6,021,141 is thus limited by crystal length, laser power limitations and walk-off issues.

One known partial solution involves the use of a reflective surface to provide for multiple passes through the nonlinear material as described e.g., in U.S. Pat. No. 5,321,718. Alternatively, as described in U.S. Pat. No. 5,500,865, multiple crystals in sequence can be used. However when focusing is required, such as in the cases of CW (continuous wave) or CW-mode-locked lasers, the doubling and sum-frequency conversion efficiencies are typically no greater than about 25%. In the case of most CW lasers, the limiting factors are primarily short focal depth and/or inadequate laser intensity. A discussion of frequency conversion theory can be found in "Non-Linear Optics" by Robert W. Boyd, $2^{nd}$ Edition, 2003 Academic Press, ISBN No.0-12-121682-9, especially pages 4–10 and 79–111, and in "Laser Fundamentals" by William Silfvast, Cambridge University Press 1996, ISBN No. 0-521-55617-1, especially at pages 490–493.

When effecting multipass frequency conversion, existing frequency conversion techniques suffer from changes in conversion efficiency due to changes in the dispersion characteristics of the optical train, which changes can arise from a variety of causes. For example, change can occur due to any one or more of the following:

i) stress induced change in a (the) frequency conversion crystal which occurred during assembly.
ii) change in the alignment of one or more components of the optical train.
iii) changes in the composition of the atmosphere in the container housing the optical train.
iv) changes in the chemistry/structure of the laser gain medium and/or frequency conversion crystal.

As described in copending, commonly assigned application Ser. No. 10/349,379. it is known to be advantageous to use phasors, either plane parallel or preferably wedged, in an optical train when using a multi-pass or multi-crystal system to effect frequency conversion. The primary role of the phasor is to ensure constructive interference among the second harmonic beams generated on each pass through the single crystal, or each of multiple crystals.

When dealing with a tunable laser system it is necessary to be able to accommodate a variety of input wavelengths. Also, in some cases it may be advantageous to have means to vary the efficiency of the non-linear optical conversion.

Prior art frequency conversion designs also do not provide a convenient method for detecting and/or correcting the effect of drift in the laser emission wavelength. It is important to be able to compensate for these changes so as to maintain the efficiency of the optical frequency conversion.

A common factor in all of the aforementioned frequency conversion techniques is that, when carried out in accordance with the present invention, a phasor will be present in the optical train. Although the present invention will be most extensively described in conjunction with second harmonic and OPO generation, it is equally applicable to the other aforementioned frequency conversion techniques when a wedged or plane parallel phasor is present in the optical train.

Second harmonic generation (SHG) is a nonlinear optical process where an optical beam, called the pump beam, interacts with an optically nonlinear medium to generate a second harmonic beam, where the frequency of the second harmonic beam is twice the frequency of the pump beam. Equivalently, the free space wavelength of the second harmonic beam is half the free space wavelength of the pump beam. The pump beam can interact with the optically nonlinear medium by passing through the medium and/or by being reflected from the medium. In theory, any material which lacks inversion symmetry can be used as the optically nonlinear medium for SHG. Materials which are suitably used for SHG include $LiNbO_3$, $LiTaO_3$ and $KTiOPO_4$ (KTP). For SHG, the non-linearity of a material is expressed in terms of a second order nonlinear susceptibility tensor $\chi^{(2)}$.

Second harmonic generation (especially when using a continuous-wave pump beam) tends to be an inefficient process. Efficiency is the ratio of power emitted in the second harmonic beam divided by the power of the pump beam. The main reason for this inefficiency is that the nonlinearities provided by optically nonlinear materials tend to be weak. Therefore, various measures to improve SHG efficiency have been developed. As indicated, one way to increase efficiency is to provide more power in the pump beam since the second harmonic beam power is proportional to the square of the pump beam power (i.e., $P_{2\omega} \ll P_\omega$, where $P_{2\omega}$ and $P_\omega$ are the second harmonic power and pump power, respectively). However, the available pump beam power is usually limited, so methods of increasing SHG efficiency for a fixed pump power are of great interest.

Ensuring phase-matching between the pump beam and the second harmonic beam is the most important of these methods. Phase-matching is collinear if the pump and second harmonic wave vectors are parallel, and non-collinear if the pump and second harmonic wave vectors are not parallel. Collinear phase-matching is generally preferred to non-collinear phase-matching.

Assume a pump beam illuminates a section of an optically nonlinear medium. If the phase-matching condition is not satisfied, second harmonic radiation emitted from various points along the illuminated section will interfere destructively, and as a result, the second harmonic beam power will be a periodic function of position, with period $2L_c$, along the illuminated section. As taught in U.S. Pat. No. 3,407,309 to R. C. Miller, in type I SHG, the coherence length $L_c$ is given by $L_c = \lambda/4\Delta n$, where $\lambda$ is the free space wavelength of the pump beam, $\Delta n = |n_\omega - n_{2\omega}|$, where $n_\omega$ is the refractive index of the nonlinear medium at the pump wavelength and $n_{2\omega}$ is the refractive index of the nonlinear medium at the second harmonic wavelength. If the phase-matching condition is exactly satisfied, i.e., $n_\omega = n_{2\omega}$, there will be no destructive interference, and as a result, the second harmonic beam power will increase monotonically along the illuminated section. In a nonlinear device of length L, phase-matching would be sufficiently well achieved if $L_c$ is comparable to, or larger than, L. Since L is typically on the order of 1 cm, and $\lambda$ is typically on the order of 1 µm, $\Delta n$ must be smaller than about 0.00003 to achieve phase-matching in a typical nonlinear optical device.

Because $\Delta n$ is typically significantly larger than 0.00003, due to the dependence of refractive index on wavelength (i.e., dispersion), special methods must be employed to satisfy the phase-matching condition. Two of these methods are birefringent phase-matching (BPM) and quasi-phase-matching (QPM). In a birefringent material, the index of refraction experienced by an optical beam depends on the polarization of the beam. The two states of polarization are called "ordinary" and "extraordinary", with corresponding indices $n_o$ and $n_e$, in a uniaxial birefringent medium. Type I BPM is accomplished by selecting a birefringent material which emits second harmonic radiation that is orthogonally polarized to the pump radiation and by ensuring $n_{o\omega} \approx n_{e2\omega}$ (or $n_{e\omega} \approx n_{o2\omega}$). In other words, the difference in index due to dispersion is compensated for by the difference in index due to polarization, because the pump and second harmonic beams have different states of polarization. In type II BPM, the pump radiation itself is divided between two orthogonal polarizations a and b within the nonlinear crystal with refractive indexes $n_{\omega a}$ and $n_{\omega b}$, and $2\Delta n = |n_{\omega a} + n_{\omega b} - 2n_{2\omega}|$.

However, birefringent phase-matching is not always possible. For example, a nonlinear material which is not birefringent obviously cannot be birefringently phase-matched. Even for birefringent materials, it is frequently desirable for the polarization of the pump and second harmonic beams to be the same (e.g., to make use of a larger element of the $\chi^{(2)}$ tensor, or to avoid the beam walk-off frequently associated with BPM). In these cases, QPM can be employed. As indicated above, in a non-phase-matched interaction, the second harmonic power varies periodically along an illuminated section of nonlinear material with period $2L_c$. Let z be a position along the illuminated section. The second harmonic power increases to a maximum in the range $0 < z < L_c$ and then decreases back to zero in the range $L_c < z < 2L_c$, and this behavior repeats periodically. Thus the contribution of the second coherence length of material to the second harmonic beam exactly cancels the contribution of the first coherence length of material to the second harmonic beam, and the fourth coherence length cancels the third coherence length etc. Basically, the even coherence lengths cancel the odd coherence lengths.

The purpose of QPM is to disrupt this cancellation by periodically altering the properties of a nonlinear material so that each section of length $2L_c$ makes a net contribution to the second harmonic beam power. This can be accomplished in various ways. One method is to eliminate the nonlinearity of every even coherence length (e.g., by selectively disordering the material to set $\chi^{(2)}$ equal to zero). In this case, the even coherence lengths make no contribution to the second harmonic beam, and the above cancellation is eliminated. Another method is to periodically change the sign of $\chi^{(2)}$ so that $\chi^{(2)}$ in all the even coherence lengths is equal, but opposite to, $\chi^{(2)}$ in all the odd coherence lengths. This periodic alteration of $\chi^{(2)}$ can be accomplished by electrical and/or chemical poling of a ferroelectric or other suitable nonlinear material (e.g., periodic poling of $KTiOPO_4$), or by epitaxial regrowth techniques for semiconductors (e.g., GaAs). The sign change of $\chi^{(2)}$ for the even coherence lengths thus turns destructive interference into constructive interference. In other words, the second harmonic emitted by the even coherence lengths adds constructively to the second harmonic emitted by the odd coherence lengths. Since all parts of the device contribute constructively to the emitted second harmonic when the sign of $\chi^{(2)}$ is periodically changed, this form of QPM is preferable to QPM obtained by periodically setting $\chi^{(2)}$ to zero.

The above (first order) QPM methods require periodic modification of the properties of a nonlinear material with period $2L_c$. Since $L_c$ is typically small (e.g., $\Delta n=0.01$ gives $L_c=25$ µm for $\lambda=1$ µm), advanced material fabrication and/or processing technology is typically required for QPM. QPM can also be accomplished by periodically modifying material properties with a longer period (e.g., a period of $6L_c$ for third order QPM, a period of $10L_c$ for fifth order QPM etc.), but these higher order QPM methods are less efficient than first order QPM. The purpose of higher order QPM is to disrupt the cancellation of an "odd" section of length $mL_c$, by the following "even" section of length $mL_c$, by altering the material properties of each "even" section so that each section of length $2 mL_c$ makes a net contribution to the second harmonic beam power. In higher order QPM, m must be odd, so that a section of length $mL_c$ makes a nonzero contribution to the second harmonic beam power.

The pump beam for SHG generally propagates through a nonlinear medium as a Gaussian beam which is brought to a focus (i.e., has a beam waist) inside the nonlinear medium. Phase-matched SHG efficiency increases as the pump intensity and interaction length increase, so it is desirable to maximize both of these parameters. However, increasing the intensity of a beam by bringing it to a smaller focused spot increases beam divergence, which effectively reduces the interaction length. Therefore, there is an optimal waist 1/e amplitude radius w for the pump that maximizes the efficiency of phase-matched SHG in a nonlinear medium of length L. The optimal relation (assuming no beam walkoff between pump and second harmonic) between length L and waist radius w is given by $L=L_{opt}$, where $L_{opt}=5.68\ \pi w^2 n_\omega/\lambda$, and $\lambda$ is the free space pump wavelength. Since SHG efficiency does not have a sensitive dependence on L for L near $L_{opt}$, a nonlinear medium length L in the range of about $L_{opt}/3<L<3\ L_{opt}$ provides nearly optimal performance. The optimal location of the beam waist within the nonlinear medium is at the center of the nonlinear medium (i.e., separated from the entrance and exit faces by a distance L/2).

Other methods of increasing SHG efficiency can be employed in addition to phase-matching and optimal focusing. As indicated, multipass SHG is one such method, where the pump and second harmonic beams make multiple passes through the nonlinear medium. In multipass SHG, it is necessary to ensure that the pump and second harmonic beams have the proper relative phase in the second and successive passes, so that the contribution of each pass to the second harmonic beam is constructive. J. M. Yarborough et al. (Applied Physics Letters 18(3) 1970) demonstrated double pass SHG in birefringently phase-matched Lithium Niobate, where a mirror was used to retro-reflect the pump and second harmonic beams through the nonlinear medium, and the separation between the mirror and the crystal was varied to control the relative phase of the two beams in the second pass via the dispersion of air. G. Imeshev et al. (Optics Letters 23(3) 165, 1998) describe double pass SHG in quasi-phase-matched Lithium Niobate, where a mirror is used to retro-reflect the pump and second harmonic beams through the nonlinear medium, and the endface of the nonlinear medium facing the mirror is polished at a small non-zero angle relative to the QPM section boundaries. The relative phase of the pump and second harmonic beams in the second pass is adjusted by translating the nonlinear medium with respect to the beams to vary the medium thickness seen by the beams.

Translating a mirror to control the relative phase of the pump and second harmonic beams on the second pass has the disadvantage that a significant range of motion is required (e.g., on the order of several cm). Translating a wedged nonlinear optical medium to control the relative phase of the pump and second harmonic beams on the second pass is undesirable, because temperature control of the nonlinear medium is typically required, which complicates the design, and the size of the nonlinear medium must be increased to accommodate the translation. Retro-reflection of the pump beam does not preserve optimal focusing of the pump beam from the first pass to the second pass. In other words, if the pump beam is optimally focused for a first pass through a nonlinear medium, and a second pass is obtained by retro-reflection, the second pass pump beam will not be optimally focused through the nonlinear medium.

One object of the present invention is to provide an improved apparatus and method which provides a tunable/adjustable phasor between co-propagating, although not necessarily collinear, optical waves of different wavelengths. In particular, it is an object of the present invention to provide an apparatus and method which permits the adjustment of a phasor (e.g., changing its refractive index), present in the optical train subsequent to the initial assembly and throughout the service life of the frequency conversion apparatus.

A preferred embodiment is a method and apparatus to adjust the relative phase of the pump beam and second harmonic beam in multipass SHG.

A further object of the present invention is to provide an improved apparatus and method for adjusting the relative phase among all of the waves in a multipass nonlinear conversion process.

A further object of the present invention is to provide an improved apparatus and method for adjusting the relative phase among all of the waves in each of multiple, simultaneous multipass nonlinear conversion processes.

Another object of the invention is to provide an apparatus and method for ensuring that each beam on each pass is parallel to that beam on all other passes. For multipass SHG, this apparatus and method ensures that the pump beam on each pass is parallel to the pump beam on all other passes, and that the second-harmonic beam on each pass is parallel to the second-harmonic beam on all other passes.

Yet another object of the invention is to preserve optimal focusing of each beam for all passes.

Although Jeys (Optics Letters 21(16) 1220, 1999) teaches the use of a self-imaging telescope as applied to an OPG, the idler beam was discarded on each pass so that phase control was unnecessary. Discarding the idler beam is acceptable only if it is not needed as an output beam, and if back-conversion (i.e. SFG) of the signal and idler into pump would occur if the idler were not discarded. Jeys does not describe the use of a self-imaging telescope as applied to other multi-pass 3-wave nonlinear conversion processes, such as SHG, SFG, DFG, and OPA, or to other multi-pass M-wave nonlinear conversion processes (where M≠3), or to multiple simultaneous conversion processes. In addition, because Jeys used a roof prism on one side of the nonlinear medium instead of a second self-imaging telescope, the beams were necessarily focused in the roof prism instead of optimally inside the nonlinear medium.

A further object of the invention is to provide an apparatus and method for ensuring that the second-harmonic beam generated on each pass is collinear with the second-harmonic beams generated on all successive passes. That is, making a second harmonic beam generated on the first pass of the pump beam through the nonlinear medium collinear with the second harmonic beam generated on the second and all subsequent passes of the pump beam.

Another object of the invention is to provide an improved apparatus and method for continuous tuning of the signal frequency of a singly resonant OPO.

Yet another object of the invention is to provide an apparatus and method for continuous tuning of the signal and idler frequencies of a doubly resonant OPO.

Another object of the invention is to provide an apparatus and method for continuous tuning of the signal and idler frequencies of a pump-enhanced singly or doubly resonant OPO, with a fixed or tunable pump frequency. In such OPOs, the pump wave resonates in the optical resonator in addition to the signal wave, or signal and idler waves.

DESCRIPTION OF THE INVENTION

A phasor is a dispersive optical element, i.e., the refractive index is a non-constant function of the wavelength; thus, the optical phase accumulated upon transmission is not substantially proportional to the optical frequency. The ability to tune or adjust the difference in optical phase after the phasor has been placed in the optical train has several advantages, including:
  a) To fine-tune the phase difference or compensate for stresses in the frequency conversion crystal acquired during optical assembly.
  b) To compensate for changes in the dispersion of components in the optical train over time (including the gas between solid optical components), or changes in the alignment of optical components over time.
  c) To accommodate a variety of wavelength combinations, such as for tunable SHG.
  d) To vary the net efficiency of non-linear optical conversion in a multi-pass scheme by causing the relative optical phase on successive passes to be at a controllable value. In the case of SHG this determines whether second harmonic beams generated on each pass interfere constructively or destructively and to what extent.

According to one embodiment of the present invention, improved multipass SHG is provided by the use of at least one adjustable phasor, preferably a wedged phasor. This arrangement enables adjustment of the relative phase of the interacting optical waves, i.e., the pump beam and second harmonic beam between passes.

According to one preferred embodiment of the invention, improved multipass SHG is provided by the use of an inverting self-imaging telescope in combination with a wedged phasor as described in co-pending, commonly assigned U.S. patent applications Ser. No. 10/349,379 filed Jan. 21, 2003, and Ser. No. 10/869,623 filed Jun. 16, 2004, the entire disclosure of which is incorporated herein by this reference. This arrangement provides a simple adjustment of the relative phase of the pump beam and second harmonic beam between passes, and ensures parallelism of all passes of all beams within the nonlinear medium. This arrangement allows the second harmonic beam generated on each pass to be made collinear upon subsequent passes within the nonlinear medium with the second harmonic beam generated on those subsequent passes.

Numerous methods can be used to effect the dispersion of the phasor by changing its refractive index, including:
  1) Thermo-optic tuning.
  2) Electro-optic tuning.
  3) Elasto-optic tuning.

The particular geometry of the phasor (e.g., wedge, angle of incidence) and its location within the optical train (e.g., phasor outside or within the telescope, choice of full telescope or single concave or planar mirror) do not affect the tunability of the phasor. The refractive index at each of the relevant wavelengths should change so that the net optical phase difference also changes.

This phase difference $\Delta\phi$ for a combination of three waves is:

$$\Delta\phi = 2\pi L\left(\frac{n_3}{\lambda_3} - \frac{n_2}{\lambda_2} - \frac{n_1}{\lambda_1}\right),$$

where $n_i$ is the refractive index of wave i including the effect of the polarization of wave i, $\lambda_i = c/\omega_i$ is the free-space wavelength of wave i, c is the free space velocity of light, and L is the path length of the optical beam through the phasor. This definition of the phase difference is relevant for a combination of waves, the frequencies of which obey, $\omega_1 + \omega_2 = \omega_3$, as described in the Background of the Invention. The tuning method, the particular phasor material, and/or the length of the phasor may be chosen to optimize the tuning rate for a given application.

For the special case of type I SHG, for which $\omega_1 = \omega_2$ and fundamental waves 1 and 2 have the same polarization, the phase difference is:

$$\Delta\phi = 2\pi L\left(\frac{n_3}{\lambda_3} - \frac{2n_1}{\lambda_1}\right),$$

where wave 3 is the second harmonic wave. For type II SHG, the two fundamental waves have different polarizations, and hence, could have different refractive indexes in the phasor if the phasor is birefringent. Therefore, for type II SHG with a birefringent phasor, the equation of the phase difference for a combination of three waves applies, with $\lambda_1 = \lambda_2$, but with separate $n_1$ and $n_2$.

More generally, for an arbitrary number of waves, the phase difference is:

$$\Delta\phi = 2\pi L\sum_{i=1}^{M}\frac{S_i n_i}{\lambda_i},$$

which is relevant for a combination of waves, the frequencies of which obey:

$$\sum_{i=1}^{M} S_i \omega_i = 0,$$

for each process m.

As indicated, for type I second harmonic generation, this phase difference is:

$$\Delta\phi = 2\pi L\left(\frac{n_{SH}}{\lambda_{SH}} - \frac{2n_f}{\lambda_f}\right)$$

where $n_{SH}$ is the refractive index of the second-harmonic beam, $\lambda_{SH}$ is the free-space wavelength of the second-harmonic beam, $n_f$ is the refractive index of the fundamental beam, $\lambda_f$ is the free-space wavelength of the fundamental beam and L is the path length of the optical beam through the phasor. The tuning method, the type of phasor material, and/or the length of the phasor may be chosen to optimize the tuning rate for a given application.

As a first example, consider a glass phasor. This is most easily tuned using temperature (thermo-optic) tuning e.g., with a Peltier unit in contact with the phasor. To obtain a change in phase difference of $2\pi$ between a 976 nm fundamental wave and 488 nm second-harmonic wave requires approximately 3° C. of temperature range for a 5 mm long phasor of SF6 glass, double-passed.

As a second example, consider a 12 mm. long KTP phasor. This can be tuned by temperature over a few degrees C. It can be tuned by the electro-optic effect (having relatively large electro-optic coefficients for tuning/polarization axis combinations) by applying an electric field to the KTP. It can also be tuned by the elasto-optic effect by applying a mechanical strain (such as compression) to the KTP.

According to another embodiment of the invention, an improved set of multiple simultaneous multipass nonlinear mixing processes is provided by the use of plural adjustable phasors, preferably wedged phasors. The suitable number of phasors equals the number of simultaneous multipass nonlinear mixing processes. Each phasor has a different dispersion, so that the changes in the optical path lengths of the optical waves by adjustment of the set of phasors is linearly independent: any combination of relative phases of all simultaneous nonlinear processes can be achieved by adjustment of the phasors. The relative phase of process m is described by:

$$\Delta\phi_m = 2\pi L\sum_{i=1}^{M}\frac{S_{mi}n_i}{\lambda_i},$$

where M, and $S_{mi}$ are as defined above for multiple nonlinear processes, and which is relevant for a combination of waves, the frequencies of which obey:

$$\sum_{i=1}^{M} S_{mi}\omega_i = 0,$$

According to a further embodiment of the invention, an improved set of multiple simultaneous multipass nonlinear mixing processes is provided by the use of an inverting self-imaging telescope, preferably in combination with multiple wedged phasors.

According to a further embodiment of the invention, an improved continuously tunable singly-resonant OPO is provided by the use of an adjustable phasor, preferably a wedged phasor. Adjustment of this phasor permits continuous tuning of the resonating signal beam frequency, which thereby results in continuous tuning of the idler frequency.

According to a further embodiment of the invention, an improved continuously tunable, pump-enhanced, singly-resonant OPO is provided by the use of an adjustable phasor, preferably a wedged phasor. Adjustment of this phasor, if desired in conjunction with adjustment of the physical length of the OPO optical resonator, and/or an additional phasor, permits continuous tuning of the resonating signal frequency while the pump frequency remains constant and resonant in the OPO, which thereby results in continuous tuning of the idler frequency. Alternatively, the pump frequency may also be tuned, and the adjustment of phasors and/or cavity length performed such that the pump frequency remains resonant in the OPO and such that the signal frequency is tuned.

According to yet another embodiment of the invention, an improved doubly-resonant OPO is provided by the use of an adjustable phasor, preferably a wedged phasor. Adjustment of this phasor, optionally in combination with adjustment of the physical length of the OPO optical resonator, and/or an additional phasor, permits continuous tuning of the signal and idler frequencies while the pump frequency remains constant. Use of a wedged phasor of only one optical material to effect continuous tuning requires simultaneous adjustment of the physical optical resonator length. Use of a phasor consisting of two wedges of optical materials of different optical dispersion can eliminate the need for simultaneous adjustment of the physical optical resonator length, by appropriate choice of the optical materials (optical dispersion) and wedge angles. Alternatively, two wedges of optical materials of different optical dispersion, adjusted simultaneously, also effects continuous frequency tuning.

According to yet another embodiment of the invention, an improved pump-enhanced doubly-resonant OPO is provided by the use of one or two adjustable phasors, preferably wedged phasors. Adjustment of one or two phasors, optionally in combination with adjustment of the physical length of the OPO optical resonator, and/or a third phasor, permits continuous tuning of the signal and idler frequencies while the pump frequency remains constant and resonant in the OPO. Use of only two wedged phasors, each of only one optical material, to effect continuous tuning requires simultaneous adjustment of the physical optical resonator length. Use of a phasor consisting of two wedges of optical materials of different optical dispersion can eliminate the need for simultaneous adjustment of the optical resonator length or for a third phasor, by appropriate choice of the optical materials (i.e., optical dispersion) and wedge angles. Alternatively, two wedges of optical materials of different optical dispersion adjusted simultaneously may be equivalent to a phasor consisting of two wedges. Use of a phasor consisting of three wedges of optical materials of different optical dispersion can eliminate the need for simultaneous adjustment of the physical optical resonator length or of any other phasor, by appropriate choice of the optical materials (i.e., optical dispersion) and wedge angles. Alternatively, three wedges of optical materials of different optical dispersion adjusted simultaneously may be equivalent to a phasor consisting of three wedges.

BRIEF DESCRIPTION OF THE DRAWINGS

FIG. 5b is a schematic top view of a doubly-resonant OPO embodiment of the invention using two phasors of different materials (different dispersions).

FIG. 5c is a schematic top view of a doubly-resonant OPO embodiment of the invention using one phasor composed of two wedges of different materials (different dispersions).

DETAILED DESCRIPTION OF THE DRAWINGS

Figure 1:
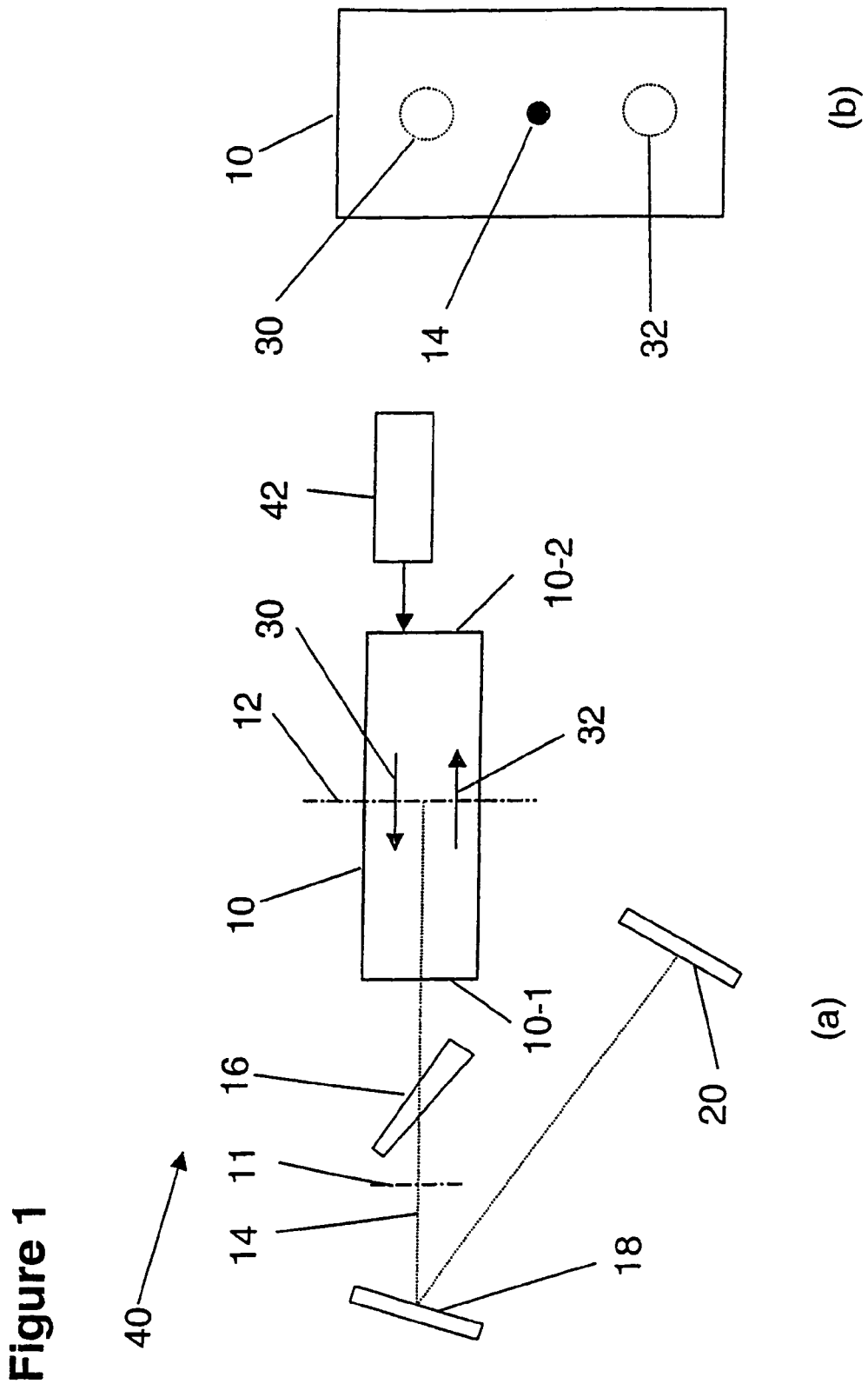
FIG. 1a is a schematic top view of a double pass SHG embodiment of the invention.
FIG. 1b is a schematic end view of a nonlinear medium in a double pass SHG embodiment of the invention.

FIG. 1a is a schematic top view of a double pass frequency doubling apparatus 40, in accordance with the present invention, while FIG. 1b is a schematic end view of a nonlinear medium 10 within apparatus 40. To appreciate the operation of apparatus 40, it is helpful to consider the beam paths through apparatus 40 before discussing the design of apparatus 40 in detail. A pump beam provided by a pump source 42 is received by a face 10-2 of nonlinear medium 10, and is transmitted along a beam path 30 through nonlinear medium 10. A second harmonic beam, with frequency twice the pump frequency, is generated within nonlinear medium 10, and is also transmitted along beam path 30 through nonlinear medium 10. The pump and second harmonic beams are emitted from a face 10-1 of nonlinear medium 10, and are received by a phasor 16. The beams are transmitted through phasor 16 and are received by a mirror 18. The pump and second harmonic beams are then reflected by mirror 18 and are received by a mirror 20. Both beams are reflected by mirror 20, reflected again from mirror 18, transmitted again through phasor 16, and received by face 10-1 of nonlinear medium 10. The second pass pump and second harmonic beams are transmitted along a beam path 32 through nonlinear medium 10, and are emitted from face 10-2 of nonlinear medium 10.

Beam paths 30 and 32 through nonlinear medium 10 are preferably parallel to and spaced apart from each other, as indicated on FIG. 1b. This is accomplished by choosing mirrors 18 and 20 such that they act as an inverting telescope to re-image a reference plane 12 located at the center of nonlinear medium 10 onto itself with negative unity magnification. Axis 14 is the axis of the telescope formed by mirrors 18 and 20, and is substantially centered within nonlinear medium 10 as indicated in FIGS. 1a and 1b. Thus, beam path 32 is the image of beam path 30 formed by the inverting telescope, and separation of beam paths 30 and 32 is obtained by offsetting beam path 30 from axis 14 as indicated in FIG. 1b. This separation of the second pass (beam path 32) from the first pass (beam path 30) is advantageous, since no additional optical elements are required to separate the second pass beams from the first pass beams.

Nonlinear medium 10 can be any material which lacks inversion symmetry. Preferably, nonlinear medium 10 is phase-matched to increase SHG efficiency. Periodically-poled KTiOPO$_4$ (PPKTP) is one suitable nonlinear medium 10, but other nonlinear materials, such as Lithium Niobate, Lithium Tantalate, or beta-Barium Borate, can also be used to practice the invention, using phase-matching techniques, including but not limited to, birefringent phase-matching and quasi-phase-matching. In some cases, it is important to avoid reflection of the pump beam back into the pump source; and in these cases, nonlinear medium 10 (or face 10-2 of nonlinear medium 10) can be slightly tilted (by approximately 1 degree to a few degrees) so that the pump beam is not exactly normally incident on face 10-2 of nonlinear medium 10. This ensures that the pump beam reflected from face 10-2 of nonlinear medium 10 does not couple back into the pump source. Preferably, faces 10-1 and 10-2 of nonlinear medium 10 are anti-reflection coated to provide a low reflectivity (i.e. reflectivity<1 percent, more preferably<0.5 percent) at both the pump frequency (or wavelength) and second harmonic frequency (or wavelength) to reduce loss in apparatus 40.

The purpose of phasor 16 is to adjust the relative phase of the pump and second harmonic beams as the beams enter nonlinear medium 10 for a second or subsequent pass (i.e., beam path 32) so that the second pass contributes constructively to the second harmonic beam already present from the first pass. Phasor 16 is fabricated as a wedged plate of a dispersive optical material, i.e., a material which has a different index of refraction at the pump frequency and second harmonic frequency, where the wedge angle between the phasor surfaces is roughly on the order of 0.1 degree to 1 degree. Because phasor 16 is a wedged plate, the amount of dispersive material it introduces into the beam path is variable by translating the phasor perpendicular to the beams. For example, consider doubling of 976-nm radiation to 488 nm. A suitable material for phasor 16 is the commercial glass BK7, which has $n_\omega$=1.508 and $n_{2\omega}$=1.522 at these wavelengths, respectively. The coherence length of BK7 in this example is $L_c$=17.4 µm. Since the beam makes a double pass through phasor 16, a full $2\pi$ adjustment of the relative phases of pump and second harmonic beams is obtained by varying the phasor thickness seen by the beams by $L_c$=17.4 µm. Phasor 16 is preferably inserted into assembly 40 so that both pump and second harmonic beams are incident on phasor 16 at or near Brewster's angle and have p polarization (i.e., electric field vector lying in the plane of incidence of a phasor surface), to reduce reflection losses from the surfaces of phasor 16. Alternatively, phasor 16 may have an antireflection coating on its optical surfaces so that the phasor can be used at angles other than Brewster's angle without introducing substantial reflection losses.

Mirror 18 is a concave mirror with a radius of curvature R. Mirror 20 is a flat mirror which is separated from mirror 18 by a length L which is substantially equal to the focal length f=R/2 of mirror 18. Mirrors 18 and 20 are highly reflective (with a reflectivity preferably greater than 99.5 percent) at both the pump and second harmonic frequencies. Mirrors 18 and 20 together form a telescope subassembly having an ABCD matrix (for both the pump and second harmonic beams) with A=−1, B has a real value which depends on the location of plane 11 relative to mirror 18, C=0 and D=−1, with respect to an input and output reference plane 11 located between mirror 18 and phasor 16. The ABCD matrix describes the geometrical imaging properties of an optical system as follows:

$$\begin{pmatrix} y \\ y' \end{pmatrix} = \begin{pmatrix} A & B \\ C & D \end{pmatrix} \begin{pmatrix} x \\ x' \end{pmatrix} \quad (1)$$

where x and x' are the position and slope, respectively, of an input ray relative to the optical axis of the system (i.e., axis 14 on FIG. 1a) at the input reference plane of the optical system, and y and y' are the position and slope, respectively, of the corresponding output ray at the output reference plane of the optical system.

Any basic optical element can be expressed with a single ABCD matrix. For example, a propagation distance L through medium with index of refraction n can be expressed with the following ABCD matrix:

$$\begin{bmatrix} 1 & L/n \\ 0 & 1 \end{bmatrix}$$

Similarly, a simple thin lens is expressed with the following ABCD matrix:

$$\begin{bmatrix} 1 & 0 \\ -1/f & 1 \end{bmatrix}.$$

The ABCD matrices for more complicated multi-element systems can be obtained by matrix multiplication of the cascaded basic elements. For example, consider the inverting telescope used in Applicants' invention to redirect the beams between passes in the multipass geometry. This telescope consists physically of two elements: concave mirror 18 and plano mirror 20. In matrix formalism, and replacing the concave mirror with the functionally equivalent thin lens of focal length R/2, this telescope consists of three ABCD matrix elements: a thin lens (the concave mirror), a free space distance equal to twice the separation of elements 18 and 20, and a second identical thin lens (the second reflection off the concave mirror). The ABCD matrix representing this assemblage is the product of the three matrices for the above elements, or:

$$\begin{bmatrix} 1 & 0 \\ -1/f & 1 \end{bmatrix} \begin{bmatrix} 1 & L/n \\ 0 & 1 \end{bmatrix} \begin{bmatrix} 1 & 0 \\ -1/f & 1 \end{bmatrix}$$

If we set the separation of the two elements 18 and 20 to be equal to the focal length f, then the distance L/n=2f. If one then performs the matrix multiplication the following result is obtained:

$$= \begin{bmatrix} 1 & 0 \\ -1/f & 1 \end{bmatrix} \begin{bmatrix} -1 & 2f \\ -1/f & 1 \end{bmatrix}$$

$$= \begin{bmatrix} -1 & 2f \\ 0 & -1 \end{bmatrix}.$$

We thus see that the ABCD matrix for the −1 magnification telescope has A=D=−1, and C=0. In this single lens telescope, the value for B=2f, perforce a real number. For a given off-axis angular alignment of a beam input into the telescope, B represents the relationship between a given off-axis angular alignment of a beam input to the telescope and the resulting positional output alignment. Thus, any real value for B will bring equivalent benefits from use of the telescope. Real is used in the mathematical sense, i.e., a number which is not complex or imaginary and therefore includes negative whole numbers and 0.

For optical systems which retro-reflect a beam, it is frequently convenient to select the same plane (e.g., reference plane 11) as the input reference plane and as the output reference plane.

Mirror 18 is preferably positioned such that the diffractive distance between reference plane 12 at the center of nonlinear medium 10 and mirror 18 is substantially equal to the focal length of mirror 18. The diffractive distance between two points separated by regions of length $L_i$ and index $n_i$ is, in most instances, $\Sigma L_i/n_i$. The computation of the refractive distance is more complex for birefringent media, such as nonlinear crystals. With this relative positioning of mirror 18 and nonlinear medium 10, reference plane 12 is re-imaged onto itself (with −1 magnification, i.e., inversion) by the telescope subassembly. This ensures that optimal focusing is preserved from one pass to the next. That is, if the first pass pump beam is optimally focused through nonlinear medium 10, (i.e., it has a beam waist of the appropriate size at reference plane 12 at the center of nonlinear medium 10), the second pass pump beam will also be optimally focused through nonlinear medium 10.

Although the primary purpose of the telescope subassembly is to couple the pump and second harmonic beams emitted from nonlinear medium 10 after the first pass back into nonlinear medium 10 for a second pass, the above properties of the ABCD matrix of the telescope subassembly have additional advantageous consequences.

The condition C=0 ensures that the output ray slope depends only on the input ray slope (i.e., it does not depend on input ray position). Therefore, two rays which are parallel at the input of an optical system with C=0 will be parallel at the output of that system. Optical systems with C=0 are telescopes. The condition D=−1, in combination with the condition C=0, ensures that the first pass and second pass ray slopes of the pump beam (and the first pass and second pass ray slopes of the second harmonic beam) are identical between phasor 16 and mirror 18. The sign change of the ray slope from D=−1 is cancelled out by the sign change due to the reversal of the optical axis. This equality of ray slopes also extends into nonlinear medium 10, since there are no focusing elements between mirror 18 and nonlinear medium 10, so the second pass pump beam is parallel to the first pass pump beam within nonlinear medium 10, and the second pass second harmonic beam is parallel to the first pass second harmonic beam within nonlinear medium 10. Parallelism between first and second passes is advantageous because phase-matching typically has a narrow angular acceptance. If the first and second passes go through nonlinear medium 10 at significantly different angles, it may be impossible to efficiently phase-match both passes simultaneously.

The preservation of beam parallelism between the first and second passes also ensures that the linearly varying thickness of phasor 16 across the beam cross-sections is cancelled in a double pass through phasor 16. In other words, the relative phase shift imparted to the second harmonic beam relative to the pump beam by a double pass through phasor 16 does not vary from point to point within the beams. Similarly, if nonlinear medium 10 has a linearly varying thickness from point to point within the beams (e.g. if face 10-1 is tilted with respect to the beams and face 10-2 is not tilted), the effect on relative optical phase due to this variable thickness is cancelled in a double pass.

The arrangement of mirror 18 and mirror 20 shown in FIG. 1a is a preferred telescope subassembly, since mirror 18 has the same focal length at both the pump and second harmonic frequencies. Other telescope subassemblies with A=−1, C=0 and D=−1 (at both pump and second harmonic wavelengths) are also suitable for practicing the invention. In all cases it is preferred to position the telescope subassembly relative to nonlinear medium 10 such that reference plane 12 at the center of nonlinear medium 10 is substantially re-imaged onto itself with −1 magnification, in order to preserve optimal focusing from one pass to the next, i.e. B=0

Although the telescope subassembly with A=−1, C=0 and D=−1 ensures beam parallelism within nonlinear medium 10, beam collinearity of the second-harmonic generated on the first pass with that generated on the second pass within nonlinear medium 10 is not ensured by the telescope subassembly. In other words, it is possible for the axis in the second pass of the second harmonic beam generated on the first pass to be laterally separated from the axis of the second harmonic beam generated on the second pass. This is because in the second pass, the second harmonic generated on the first pass may be displaced from the fundamental differently from in the first pass. Two sources of this undesirable beam offset are the dispersion of phasor 16 and the dispersion of nonlinear medium 10 (if the beams intersect face 10-1 of nonlinear medium 10 at a non-normal angle of incidence). The beam offset is affected by the wedge angle of phasor 16, the nominal thickness of phasor 16, the angle of incidence on the phasor, the length of nonlinear medium 10 (assuming the design is constrained to re-image reference plane 12 onto itself with −1 magnification), the angle of incidence on face 10-1 of nonlinear medium 10, and the distance between phasor 16 and nonlinear medium 10. Since varying these parameters changes the beam offset without affecting the parallelism preserving property of the telescope subassembly (i.e. the relative angle between fundamental and second harmonic beams), the beam offset can be eliminated by design.

An additional consideration in a detailed design is astigmatism compensation, because phasor 16 and mirror 18 both cause astigmatism. The relevant parameters are the thickness, incidence angle and wedge angle of phasor 16, and the focal length and incidence angle of mirror 18. Again, these parameters offer enough flexibility to eliminate the net astigmatism of apparatus 40 by design (i.e., by ensuring that the astigmatism of phasor 16 compensates for the astigmatism of mirror 18, and conversely). In addition, there are enough parameters to eliminate astigmatism and to preserve collinearity simultaneously. It is desirable to ensure that apparatus 40 has no net astigmatism, to maximize conversion efficiency and to provide a non-astigmatic second harmonic beam after the second pass. It is also possible to eliminate astigmatism from apparatus 40 by adding one or more optical elements to apparatus 40 in accordance with known principles of telescope astigmatism compensation.

To generalize to a double-pass, nonlinear optical frequency mixing apparatus with an arbitrary number of waves in a single phase-matched process as described by a single sum of frequencies, one can substitute "input beam" for "pump beam" and substitute "additional beams" for "second harmonic beam" in the foregoing description of the embodiment shown in FIG. 1. Input waves can be either amplified or depleted, while additional waves are always amplified. Waves designated i are only input waves such that $S_i$=−1, while waves designated j can be either input waves or additional waves such that $S_j$=+1. All results described for FIG. 1 are still valid except that because in the embodiment of FIG. 1 there is only a single input beam i there can be no overlap of waves i. Also, to achieve the collinearity of each wave j generated on all passes, plural phasors may be required. The waves j generated on each pass can be made collinear for at least one j by designing the optical system as described above for FIG. 1 by selecting an appropriate phasor shape, although there must be sufficient degrees of freedom to obtain this collinearity for more than one j. Alternatively, the location of the intersection (or collinearity) of two beams $i_1$ and $i_2$ may be maintained among all passes by design, although again there must be sufficient degrees of freedom to obtain this property for more than one pair of beams. The use of additional phasors can provide enough degrees of freedom to obtain optimum intersection of all beams i and the collinearity of the beams of each j generated on each pass.

FIG. 2a is a schematic top view of a four pass frequency doubling apparatus 50, in accordance with the present invention, while FIG. 2b is a schematic end view of nonlinear medium 10 within apparatus 50. To appreciate the operation of apparatus 50, it is helpful to consider the beam paths through apparatus 50 before considering the design of apparatus 50 in detail. A pump beam is received by face 10-2 of nonlinear medium 10, and is transmitted along beam path 30 through nonlinear medium 10. A second harmonic beam, with a frequency twice the pump frequency, is generated within nonlinear medium 10, and is also transmitted along beam path 30 through nonlinear medium 10. The pump and second harmonic beams are emitted from face 10-1 of nonlinear medium 10, and are received by phasor 16. The beams are transmitted through phasor 16 and are received by mirror 18. The pump and second harmonic beams are reflected by mirror 18 and are received by mirror 20. Both beams are reflected by mirror 20, reflected again from mirror 18, transmitted again through phasor 16, and received by face 10-1 of nonlinear medium 10. The pump and second harmonic beams are transmitted in a second pass along beam path 32 through nonlinear medium 10, and are emitted from face 10-2 of nonlinear medium 10.

These two emitted beams are received by a phasor 16', transmitted through phasor 16', received by a mirror 18', reflected from mirror 18' and received by a mirror 20'. After reflection from mirror 20', the pump and second harmonic beams are reflected again from mirror 18', transmitted again through phasor 16', and received by face 10-2 of nonlinear medium 10. The pump and second harmonic beam are transmitted in a third pass along beam path 34 through nonlinear medium 10, and are emitted from face 10-1 of nonlinear medium 10.

These two emitted beams are received by phasor 16, transmitted through phasor 16, received by mirror 18, reflected from mirror 18, and received by mirror 20. After reflection from mirror 20, the pump and second harmonic beams are reflected again from mirror 18, transmitted again through phasor 16, and received by face 10-1 of nonlinear medium 10. The pump and second harmonic beams are transmitted in a fourth pass along beam path 36 through nonlinear medium 10, and are emitted from face 10-2 of nonlinear medium 10.

Beam paths 30, 32, 34 and 36 through nonlinear medium 10 are separated from each other, as indicated on FIG. 2b. This is accomplished by choosing mirrors 18 and 20 such that they act as a first inverting telescope to re-image reference plane 12 located at the center of nonlinear medium 10 onto itself with negative unity magnification. Axis 14, which is the axis of the telescope formed by mirrors 18 and 20, is substantially centered within nonlinear medium 10 as indicated on FIG. 2b. Thus, beam path 32 is the image of beam path 30 formed by the inverting telescope, and separation of beam paths 30 and 32 is obtained by offsetting beam path 30 from axis 14 as indicated on FIG. 2b. Mirrors 18' and 20' are also selected such that they act as an inverting telescope to re-image reference plane 12 onto itself with negative unity magnification. Axis 14' is the axis of the second telescope formed by mirrors 18' and 20', and is offset from axis 14 as indicated on FIG. 2b. Thus, third pass beam path 34 is the image of second pass beam path 32 formed by this second inverting telescope. Similarly, fourth pass beam path 36 is the image of third pass beam path 34 formed by the first inverting telescope with axis 14. Therefore, all four passes follow distinct paths through nonlinear medium 10, where second pass beam path 32 is the inversion of first pass beam path 30 about axis 14, third pass beam path 34 is the inversion of second pass beam path 32 about axis 14', and fourth pass beam path 36 is the inversion of third pass beam path 34 about axis 14.

Since the four passes in apparatus 50 do not overlap, no beam splitters (which introduce undesirable loss) are required to couple the pump beam into apparatus 50, or to couple the second harmonic beam out of apparatus 50. A preferred method for coupling the pump beam into apparatus 50 is to position a pump turning mirror 46 within apparatus 50 so that a pump beam provided by pump source 42 is reflected to follow beam path 30 through nonlinear medium 10, and such that pump turning mirror 46 does not block the second pass beams following beam path 32 through nonlinear medium 10 or the third pass beams following beam path 34 through nonlinear medium 10.

A preferred method for coupling the second harmonic beam out of apparatus 50 is to position a second harmonic turning mirror 44 within apparatus 50 so that the fourth pass second harmonic beam following beam path 36 through nonlinear medium 10 is reflected out of apparatus 50, and such that second harmonic turning mirror 44 does not block the first pass pump beam following beam path 30 through nonlinear medium 10, the second pass beams following beam path 32 through nonlinear medium 10, or the third pass beams following beam path 34 through nonlinear medium 10.

Phasor 16' has the same characteristics as phasor 16 in FIG. 1a. The first and second telescopes in apparatus 50 (formed by mirrors 18 and 20, and by mirrors 18' and 20', respectively) are both designed as indicated in the discussion of FIG. 1a, i.e., with A=D=-1 and C=0 at the relevant phasor (i.e., phasor 16 for the telescope formed by mirrors 18 and 20, and phasor 16' for the telescope formed by mirrors 18' and 20'), and designed to re-image reference plane 12 onto itself with -1 magnification. This arrangement provides the advantages of beam parallelism on all four passes, and beam collinearity and astigmatism compensation by design, also as indicated above. In addition, phasor 16 applies the same relative phase shift between the first and second passes of the beams as it does between the third and fourth passes of the beams. Because the beam pattern for the four passes is highly symmetrical, the required phase shift between the first and second passes and between the third and fourth passes is the same. Therefore, phasor 16 can simultaneously provide the required phase shift between the first and second passes, as well as between the third and fourth passes, which is highly desirable compared to an alternative where three independent phasors are used in four pass SHG. Even if a linearly varying phase shift is imposed on the beams by nonlinear medium 10 (e.g. if face 10-1 is not exactly perpendicular to the beam axes), this variation is cancelled in double pass, and phasor 16 will still simultaneously provide the required phase shift between the first and second passes, as well as between the third and fourth passes.

In many instances it is correct to make the assumption that the pump beam and second harmonic beam are collinear within nonlinear medium 10 on the first pass. This assumption is for collinear QPM or collinear BPM with negligible beam walkoff. In some cases, such as birefringent phase-matching with nonzero beam walkoff, the pump and second harmonic beams are not collinear over the entire length of nonlinear medium 10. In other cases, such as non-collinear phase-matching, the pump and second harmonic beams are not parallel within nonlinear medium 10. For these cases, the apparatus and methods discussed above are also advantageous, since compensation methods analogous to the lateral offset compensation discussed above can be applied to ensure that the second pass "undoes" the divergence of the pump beam from the second harmonic beam caused by the first pass. Similarly, the fourth pass can "undo" the relative divergence of the two beams caused by the third pass, etc.

Figure 2:
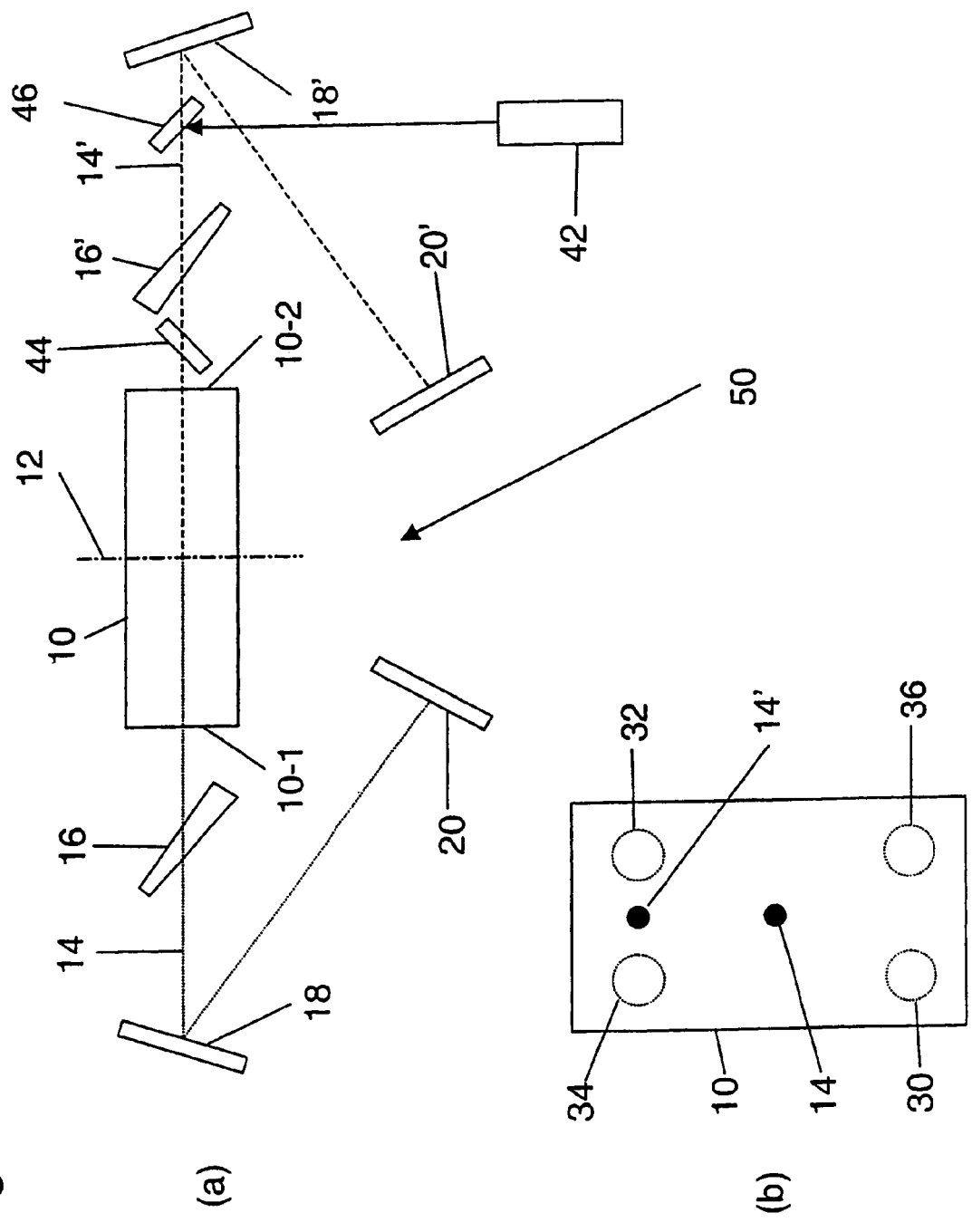
FIG. 2a is a schematic top view of a quadruple pass SHG embodiment of the invention.
FIG. 2b is a schematic end view of a nonlinear medium in a quadruple pass SHG embodiment of the invention.

FIGS. 1 and 2 also apply to the general case of a single nonlinear conversion process, of which SHG is one specific example. The nonlinear conversion process can be any one of SHG, SFG, DFG, OPA. To describe the general case, in the above descriptions of FIGS. 1 and 2 detailing SHG, the references to the pump beam can be amended to refer to each input beam, and the references to the SHG beam can be amended to refer to each additional beam generated by the nonlinear conversion process. Because in the general case, there are more than 2 beams, the ability to design the optics to ensure collinearity of each additional and amplified beam generated on each pass may in some cases require more than one phasor. However, the generation or amplification on each pass for at least one such beam can be made collinear. The use of more than 1 phasor permits one to achieve collinearity for a number of beams at least equal to the number of phasors.

Figure 3:
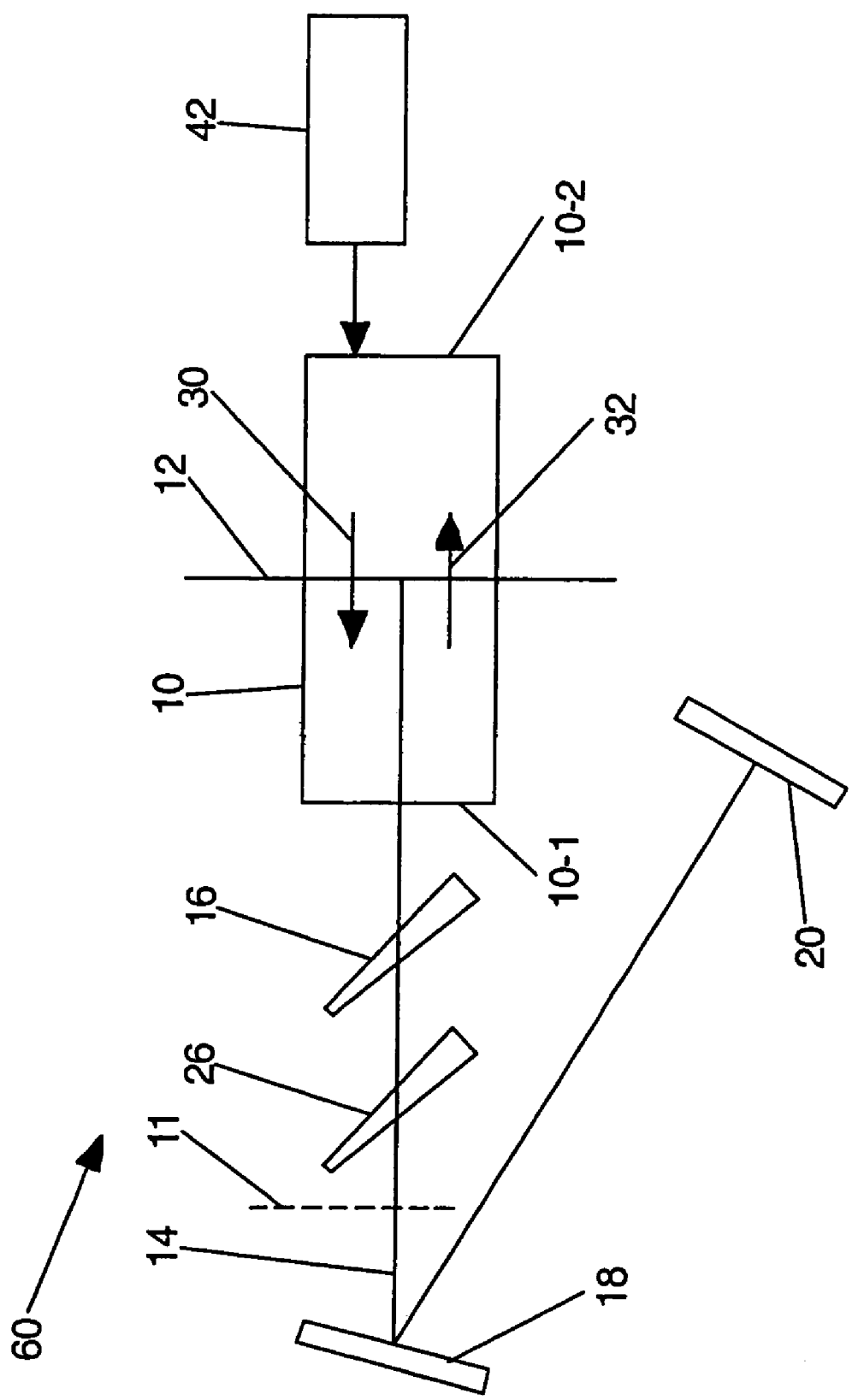
FIG. 3 is a schematic top view of a double pass embodiment of the invention applied to two simultaneous nonlinear mixing processes.

FIG. 3 is a schematic top view of a double-pass, double-frequency-mixing apparatus 60, in accordance with the present invention, similar to FIG. 1 but with two simultaneous frequency mixing processes, and hence utilizing two phasors. To appreciate the operation of apparatus 60, it is helpful to consider the beam paths through apparatus 60 before discussing the design of apparatus 60 in detail. A set of input beams, which may comprise multiple frequencies, is received by face 10-2 of nonlinear medium 10, and is transmitted along beam path 30 through nonlinear medium 10. Beams comprised of waves of at least one, and in some cases multiple frequencies, according to the two frequency relations of the two nonlinear frequency mixing processes, are generated within nonlinear medium 10, and are transmitted along beam path 30 through nonlinear medium 10. All of these beams are emitted from face 10-1 of nonlinear medium 10, and are received by phasor 16. The beams are transmitted through phasor 16 and are received by phasor 26. The beams are transmitted through phasor 26 and are received by mirror 18. The beams are reflected by mirror 18 and are received by mirror 20. The beams are reflected by mirror 20, reflected again from mirror 18, transmitted again through phasor 26 and phasor 16, and received by face 10-1 of nonlinear medium 10. The beams are transmitted in a second pass along beam path 32 through nonlinear medium 10, and are emitted from face 10-2 of nonlinear medium 10.

Beam paths 30 and 32 through nonlinear medium 10 are separated from each other, similarly as indicated on FIG. 1b. This is accomplished by choosing mirrors 18 and 20 such that they act as a first inverting telescope to re-image reference plane 12 located at the center of nonlinear medium 10 onto itself with negative unity magnification. Axis 14, which is the axis of the telescope formed by mirrors 18 and 20, is substantially centered within nonlinear medium 10 as shown in FIG. 1b. Thus, beam path 32 is the image of beam path 30 formed by the inverting telescope, and separation of beam paths 30 and 32 is obtained by offsetting beam path 30 from axis 14 as illustrated in FIG. 1b. Therefore, the two passes follow distinct paths through nonlinear medium 10, where second pass beam path 32 is the inversion of first pass beam path 30 about axis 14. This separation of the second pass (beam path 32) from the first pass (beam path 30) is advantageous, since no additional optical elements are required to separate the second pass beams from the first pass beams.

A preferred method for coupling the output beams out of apparatus 60 is to position an output turning mirror 44 within apparatus 60 so that the second pass output beams following beam path 32 through nonlinear medium 10 are reflected out of apparatus 60, and such that output turning mirror 44 does not block the first pass input beams following beam path 30 through nonlinear medium 10.

The telescope in apparatus 60 (formed by mirrors 18 and 20) is designed as indicated in the discussion of FIG. 1a, i.e., with A=D=−1 and C=0 at the phasor and designed to re-image reference plane 12 onto itself with −1 magnification. This arrangement provides the advantages of beam parallelism on both passes, and a degree of beam collinearity and astigmatism compensation, also as indicated above. Specifically, at least as many collinearity conditions may be accommodated by design as the number of phasors in the apparatus associated with each telescope. Even if a linearly varying phase shift is imposed on the beams by nonlinear medium 10 (e.g. if face 10-1 is not exactly perpendicular to the beam axes), this variation is cancelled in double pass, and phasors 16 and 26 will still simultaneously provide the required phase shift between the first and second passes.

Figure 4:
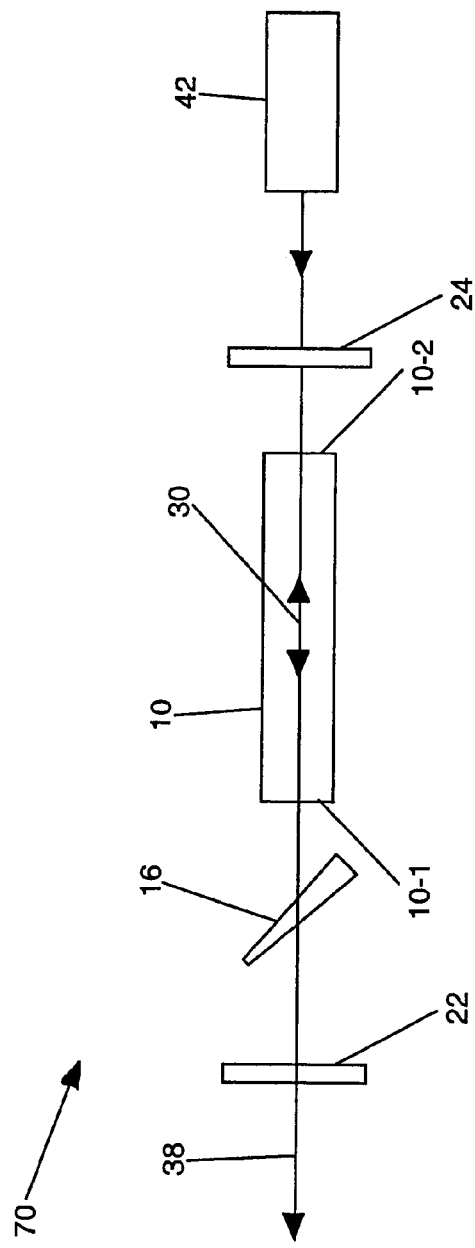
FIG. 4 is a schematic top view of a singly-resonant OPO embodiment of the invention.

FIG. 4 is a schematic top view of a standing-wave singly-resonant optical parametric oscillator (OPO) apparatus 70, configured in accordance with the present invention. To appreciate the operation of apparatus 70, it is helpful to consider the beam paths through apparatus 70 before discussing the design of apparatus 70 in detail. A pump beam provided by a pump source 42 is received by mirror 24. The pump beam is transmitted through mirror 24 to a face 10-2 of nonlinear medium 10, and is transmitted along a beam path 30 through nonlinear medium 10. In addition to the nonlinear materials previously described for use in an SHG apparatus, nonlinear materials that have been found to be useful in an OPO include $AgGeSe_2$, $AgGaS_2$ and $ZnGeP_2$. A signal beam and an idler beam, with frequencies which sum to the pump frequency, are generated within nonlinear medium 10, and are also transmitted along beam path 30 through nonlinear medium 10. The pump, signal, and idler beams are emitted from a face 10-1 of nonlinear medium 10, and are received by a phasor 16. The beams are transmitted through phasor 16 and are received by mirror 22. The pump and idler beams are transmitted through mirror 22 along output path 38. A fraction of power of the signal beam may also be transmitted through mirror 22 along output path 38. The remainder of the signal beam is retro-reflected by mirror 22 backward along path 30, and is transmitted again through phasor 16, and received by face 10-1 of nonlinear medium 10. The signal beam is transmitted along beam path 30 through nonlinear medium 10, and is emitted from face 10-2 of nonlinear medium 10. The signal beam is received by a mirror 24 and retro-reflected by mirror 24 forward onto path 30, thus forming an optical resonator for the signal beam.

The signal beam resonating in this optical resonator must have a frequency such that the round-trip optical path at the signal frequency is an integer multiple of the signal free-space wavelength, (the free-space speed of light divided by the frequency). Thus, the signal frequency is restricted to a set of discrete frequencies, known as the "modes" of the optical resonator. Only the signal beam circulates in the optical resonator, hence the OPO apparatus 70 is singly-resonant.

The purpose of phasor 16 is to adjust the total optical path length of the optical resonator, thus permitting the adjustment of the discrete frequencies available to the signal beam. By adjusting the phasor such that the optical path of the resonator changes by a full signal wavelength, any frequency can be made available for the signal beam. For example, consider a signal beam with wavelength substantially equal to 1550 nm. The refractive index of BK7 glass at 1.550 µm is n=1.50. Since the beam makes a double pass through phasor 16, a full 1.550 µm wavelength adjustment of the optical path is obtained by varying the phasor thickness seen by the signal beam by $L_\lambda$=0.7525 µm. Phasor 16 is preferably inserted into assembly 70 so that all beams are incident on phasor 16 at or near Brewster's angle and have p polarization (i.e., electric field vector lying in the plane of incidence of a phasor surface), to reduce reflection losses from the surfaces of phasor 16. Alternatively, phasor 16 may have an antireflection coating on its optical surfaces so that the phasor can be used at angles other than Brewster's angle without introducing substantial reflection losses. Mirrors 22 and 24 form an optical resonator for the signal beam. This resonator may be stable or unstable. A stable resonator requires that at least one of mirrors 22 or 24 be concave, and that the radii of curvature of mirrors 22 and 24, and the diffractive path between them meet the stability criteria known by those skilled in the art. In prior art designs, the optical path of a resonator has been adjusted by translating one of mirrors 22 or 24 parallel to path 30, to vary the physical length of the optical resonator. Using a phasor is advantageous because translating a phasor with a small wedge angle adjusts the optical path much more precisely than translating one of mirrors 22 or 24, and the optical path of a fixed phasor can be adjusted by one of the methods described previously.

Although the example in FIG. 4 is of a standing-wave OPO, it is evident to those skilled in the art of OPOs that the invention can also be applied to a traveling-wave OPO, which may consist of a ring resonator possessing mirrors in addition to 22 and 24, or which can involve manipulation of the polarization of the beams. Also, in a singly-resonant OPO, the pump beam may be substantially reflected by either of mirrors 22 and 24, but not both, and the idler beam may be substantially reflected by either of mirrors 22 and 24, but not both. This is so that substantially no power of either pump or idler circulates inside the optical resonator.

Figure 5A:
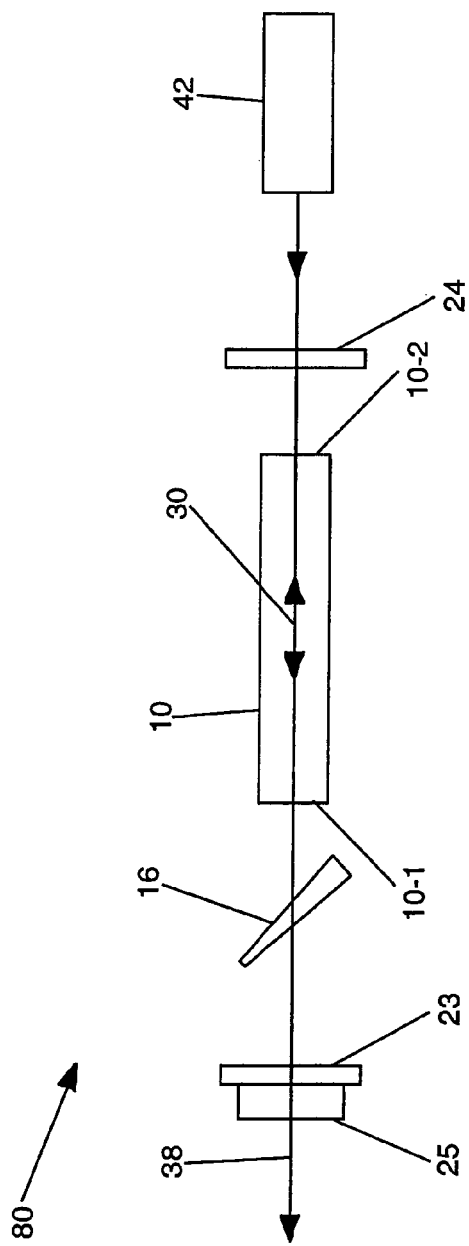
FIG. 5a is a schematic top view of a doubly-resonant OPO embodiment of the invention using only one phasor of one material.

FIG. 5a is a schematic top view of a standing-wave, doubly-resonant OPO apparatus 80, in accordance with the present invention. To appreciate the operation of apparatus 80, it is helpful to consider the beam paths through apparatus 80 before discussing the design of apparatus 80 in detail. A pump beam provided by a pump source 42 is received by mirror 24. The pump beam is transmitted through mirror 24 to a face 10-2 of nonlinear medium 10, and is transmitted along a path 30 through nonlinear medium 10. A signal beam and an idler beam, with frequencies which sum to equal the pump frequency, are generated within nonlinear medium 10, and are also transmitted along beam path 30 through nonlinear medium 10. The pump, signal, and idler beams are emitted from a face 10-1 of nonlinear medium 10, and are received by a phasor 16. The beams are transmitted through phasor 16 and are received by a mirror 23. The pump beam is transmitted through mirror 23 along output path 38. A fraction of the power of the signal and idler beams may also be transmitted through mirror 23 along output path 38. The remainder of the signal and idler beams are retro-reflected by mirror 23 backward along path 30, and are transmitted again through phasor 16, and received by face 10-1 of nonlinear medium 10. The signal and idler beams are transmitted along beam path 30 through nonlinear medium 10, and are emitted from face 10-2 of nonlinear medium 10. The signal and idler beams are received by a mirror 24 and retro-reflected by mirror 24 forward onto path 30, thus forming an optical resonator for both of the signal and idler beams. Position transducer 25 permits the adjustment of the physical cavity length by translating mirror 23 parallel to path 30. Examples of position transducer 25 include a translation stage with a motor and a piezo-electric transducer (PZT).

Each of the signal and idler beams resonating in this optical resonator must have a frequency such that the round-trip optical path at the signal frequency is an integer multiple of the signal free-space wavelength, and the round-trip optical path at the idler frequency is an integer multiple of the idler free-space wavelength. Thus, both the signal and idler frequencies are restricted to respective sets of discrete frequencies, known as the "modes" of the optical resonator. Both of the signal and idler beams circulate in the optical resonator, hence the OPO apparatus 80 is doubly-resonant. These restrictions constitute two conditions for efficient operation of this OPO. A third condition is that the sum of the frequencies of the signal and idler beams equals the pump frequency. Since the signal and idler frequencies are the only two non-restricted parameters, the doubly-resonant OPO will not operate efficiently under conditions of arbitrary optical path length and pump frequency. In the prior art, either the optical length of the resonator or the pump frequency would have to be adjusted so that all three conditions could be attained simultaneously. Efficient operation of a prior art OPO only occurred for discrete values of the resonator length (holding pump frequency fixed) or pump frequency (holding resonator length fixed), and the frequencies of the signal and idler beams could only be a limited number of discrete values. Continuous tuning of the signal and/or idler frequencies required adjusting both the resonator length and the pump frequency. The adjustment of phasor 16, in combination with translation of mirror 23, permits continuous and independent adjustment of the optical path lengths of the signal and idler beams circulating in the optical resonator. In this manner, the signal and idler frequencies may be tuned to arbitrary values (with the condition that they sum to the pump frequency), while maintaining efficient operation of the OPO, without the need to adjust the pump frequency. They may even be tuned continuously by simultaneous and synchronized adjustment of the phasor 16 and mirror 23.

FIG. 5b is a schematic top view of a standing-wave doubly-resonant OPO apparatus 90, in accordance with the present invention. To appreciate the operation of apparatus 90, it is helpful to consider the beam paths through apparatus 90 before discussing the design of apparatus 90 in detail. A pump beam provided by a pump source 42 is received by mirror 24. The pump beam is transmitted through mirror 24 to a face 10-2 of nonlinear medium 10, and is transmitted along a beam path 30 through nonlinear medium 10. A signal beam and an idler beam, with frequencies which sum to the pump frequency, are generated within nonlinear medium 10, and are also transmitted along beam path 30 through nonlinear medium 10. The pump, signal, and idler beams are emitted from face 10-1 of nonlinear medium 10, and are received by a phasor 16. The beams are transmitted through phasor 16 and are received by a phasor 26. The beams are transmitted through phasor 26 and are received by mirror 22. The pump beam is transmitted through mirror 22 along output path 38. A fraction of power of the signal and idler beams may also be transmitted through mirror 22 along output path 38. The remainder of the signal and idler beams are retro-reflected by mirror 22 backward along path 30, and are transmitted again through phasor 26 and phasor 16, and received by face 10-1 of nonlinear medium 10. The signal and idler beams are transmitted along beam path 30 through nonlinear medium 10, and are emitted from face 10-2 of nonlinear medium 10. The signal and idler beams are received by a mirror 24 and retro-reflected by mirror 24 forward onto path 30, thus forming an optical resonator for both of the signal and idler beams.

As with apparatus 80 described in FIG. 5a, it is desirable in apparatus 90 to adjust the optical path lengths of the resonator for the signal and idler beams independently, continuously, and synchronously. The independent adjustment is accomplished by adjusting phasors 16 and 26, which are preferably chosen to have linearly independent material dispersion at the signal and idler frequencies. By this choice, adjustment of one phasor changes the relative optical paths of the signal and idler beams by a different amount than the other phasor. As with apparatus 80, synchronous and continuous adjustment of the phasors in apparatus 90 provides continuous tuning of the signal and idler frequencies. Depending on the signal and idler, the phasors may need to be adjusted at different rates to accomplish continuous tuning.

FIG. 5c is a schematic top view of a standing-wave doubly-resonant OPO apparatus 100, in accordance with the present invention. To appreciate the operation of apparatus 100, it is helpful to consider the beam paths through apparatus 100 before discussing the design of apparatus 100 in detail. A pump beam provided by a pump source 42 is received by mirror 24. The pump beam is transmitted through mirror 24 to a face 10-2 of nonlinear medium 10, and is transmitted along a beam path 30 through nonlinear medium 10. A signal beam and an idler beam, with frequencies which sum to the pump frequency, are generated within nonlinear medium 10, and are also transmitted along beam path 30 through nonlinear medium 10. The pump, signal, and idler beams are emitted from face 10-1 of nonlinear medium 10, and are received by a composite phasor 36. The beams are transmitted through phasor 36 and are received by a mirror 22. The pump beam is transmitted through mirror 22 along output path 38. A fraction of the power of the signal and idler beams may also be transmitted through mirror 22 along output path 38. The remainder of the signal and idler beams are retro-reflected by mirror 22 backward along path 30, and are transmitted again through phasor 36, and received by face 10-1 of nonlinear medium 10. The signal and idler beams are transmitted along beam path 30 through nonlinear medium 10, and are emitted from face 10-2 of nonlinear medium 10. The signal and idler beams are received by a mirror 24 and retro-reflected by mirror 24 forward onto path 30, thus forming an optical resonator for both of the signal and idler beams.

Similarly to apparatus 80, it is advantageous in apparatus 100 to adjust the optical path lengths of the resonator for the signal and idler beams synchronously so that the optical path length of the signal beam increases as the optical path length of the idler beam decreases, changing the signal and idler discrete mode frequencies oppositely and by the same amount. In this manner, the signal and idler frequencies may be tuned continuously without adjusting either the resonator physical length or the pump frequency. The composite phasor 36 accomplishes this synchronous adjustment of optical path lengths by design. Phasor 36 is similar to the combination of phasors 16 and 26 in apparatus 90, but in addition the two phasors 16 and 26 should preferably be designed to be adjusted at the same rate to maintain synchronism, and attached together in series to form composite phasor 36. The adjustment of phasor 36 may be by translation, or by any of the other adjustment modes described previously.

Although the examples in FIGS. 5 are of standing-wave OPOs, it is evident to those skilled in the art of OPOs that the invention can also be applied to traveling-wave OPOs, which may consist of ring resonators possessing mirrors in addition to 22 (or 23) and 24, or which alternatively may involve manipulation of the polarization of the beams. In addition, in a doubly-resonant OPO, the pump beam may be substantially reflected by either of mirrors 22 or 23 and 24, but not both, so that substantially no power of the pump circulates inside the optical resonator.

FIGS. 5a, 5b, and 5c also illustrate examples of pump-enhanced singly-resonant OPOs in accordance with the present invention. In a pump-enhanced singly-resonant OPO, both the pump beam and signal beam circulate within the optical resonator. The optical path of the resonator at the pump wavelength must equal substantially an integer number of pump wavelengths so that the pump beam may efficiently couple into the resonator. To tune the signal wavelength while maintaining a fixed pump wavelength, two adjustments must be made substantially simultaneously, so as to change the optical path of the resonator at the signal wavelength, while keeping it fixed at the pump wavelength. Such adjustments are the same as those described previously for FIGS. 5a–5c, including one phasor and the physical cavity length, two independent phasors, or a composite phasor which, by design, provides both adjustments synchronously. Similarly, the pump wavelength may be tuned while the signal wavelength is fixed; the pump wavelength and signal wavelength may each be tuned independently (FIGS. 5a and 5b), or at rates in a fixed ratio (FIGS. 5a, 5b and 5c).

Figure 6:
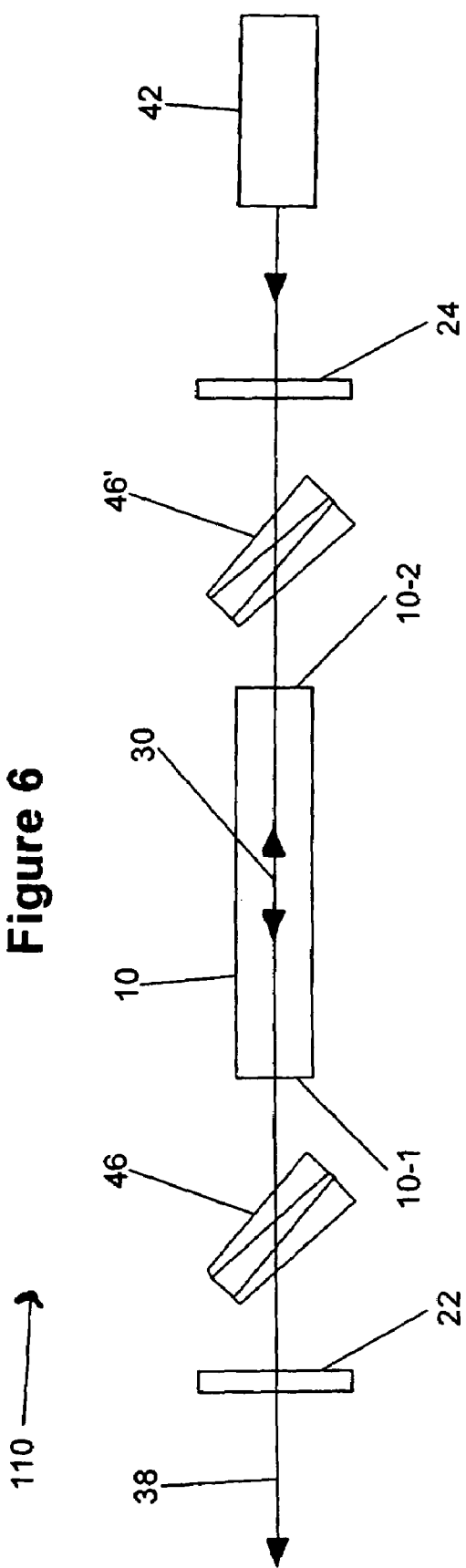
FIG. 6 is a schematic top view of a pump-enhanced doubly-resonant OPO (sometimes called a triply-resonant OPO) embodiment of the invention using one phasor composed of three wedges of different materials (different dispersions).

FIG. 6 is a schematic top view of a standing-wave, pump-enhanced doubly-resonant OPO (sometimes called a triply-resonant OPO) apparatus 110, in accordance with the present invention. To appreciate the operation of apparatus 110, it is helpful to consider the beam paths through apparatus 110 before discussing the design of apparatus 110 in detail. A pump beam, provided by a pump source 42, is received by mirror 24. The pump beam is transmitted through mirror 24 and is received by a composite phasor 46'. The pump beam is then transmitted through phasor 46' to a face 10-2 of nonlinear medium 10, and is transmitted along a beam path 30 through nonlinear medium 10. A signal beam and an idler beam, with frequencies which sum to the pump frequency, are generated within nonlinear medium 10, and are also transmitted along beam path 30 through nonlinear medium 10. The pump, signal, and idler beams are emitted from face 10-1 of nonlinear medium 10, and are received by composite phasor 46. The beams are transmitted through phasor 46 and are received by a mirror 22. A fraction of the power of each beam may be transmitted through mirror 22 along output path 38. The remainder of each beam is retro-reflected by mirror 22 backward along path 30, and is transmitted again through phasor 46, and received by face 10-1 of nonlinear medium 10. The pump, signal, and idler beams are transmitted along beam path 30 through nonlinear medium 10, and are emitted from face 10-2 of nonlinear medium 10. The pump, signal, and idler beams are received by composite phasor 46'. The beams are transmitted through phasor 46' and are received by mirror 24 and retro-reflected by mirror 24 forward onto path 30, thus forming an optical resonator for all three beams.

Similarly to apparatus 100 of FIG. 5c, it is advantageous in apparatus 110 to adjust the optical path lengths of the resonator for all three beams synchronously so that the optical path lengths of each beam change by an amount appropriate for the type of wavelength tuning desired. One such type of tuning involves a fixed pump wavelength and oppositely varying signal and idler wavelengths, as described for apparatus 100. The phasors 46 and 46' may be designed such that adjustment of each phasor varies the optical path lengths at the signal and idler wavelengths oppositely and in the correct ratio while not changing the optical path at the pump wavelength. Another type of tuning involves variable pump and idler wavelengths and a fixed signal wavelength. The phasors 46 and 46' may advantageously be designed such that their adjustments vary the optical paths of the pump and idler wavelengths in the appropriate ratio while not changing the optical path at the signal wavelength. Yet another type of tuning involves fixed ratios of tuning rates among all three waves. Thus, the pump, signal, and idler frequencies may be tuned continuously without adjusting the resonator physical length. The composite phasors 46 and 46' accomplish this synchronous adjustment of optical path lengths. Phasors 46 and 46' are similar to phasor 36 in apparatus 100, but are combinations of three phasors instead of two. The adjustments of phasors 46 and 46' may be by translation, or by any of the other adjustment modes described previously. Although only one composite phasor is required to obtain synchronous tuning of the three beams, an additional phasor on the opposite side of the nonlinear medium 10 is advantageous to maintain proper phase-matching on both the forward and backward passes through nonlinear medium 10 in a standing-wave OPO. Alternatively to the phasor 46', mirror 24 may be designed to impart an additional relative phase to the three beams such that they have the appropriate relative phase upon entry into nonlinear medium 10 at face 10-2. Mirror 24 may be coated directly onto face 10-2, in which case it preferably imparts zero additional relative phase to the three beams. In a ring OPO, only one phasor 46 is required because a ring OPO has no backward pass through the nonlinear medium 10.

A triply-resonant OPO in accordance with the present invention may be created by the addition of another phasor to any of FIGS. 5a, 5b, or 5c, and the optional duplication of the set of phasors (and cavity length adjustment) to the opposite side of nonlinear medium 10. The additional degree of freedom accorded by adjustment of this phasor permits tuning of any combination of all three beams, and the maintenance of the resonance of all three beams in the optical resonator, similarly to the conditions and limitations described for each of FIGS. 5a, 5b, and 5c.

It is also evident to those skilled in the art of OPOs and nonlinear optics that a multipass apparatus similar to that shown in FIG. 1 may be combined with any of the OPO designs shown in FIGS. 4, 5, or 6.

The advantageous phase adjustment provided by a wedged phasor can be obtained in embodiments of the present invention which do not include an inverting telescope. Multipass embodiments of the invention can have any number of passes greater than or equal to two.

The foregoing detailed description of the invention includes passages that are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure or embodiment, such feature can also be used, to the extent appropriate, in the context of another figure or embodiment, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:

1. Apparatus for the nonlinear frequency conversion of optical radiation, the apparatus comprising:
    a) an optically nonlinear medium that receives at least one input beam wherein each of said at least one beam makes N passes through the nonlinear medium, wherein each pass is spatially separate from all preceding passes, where N is an integer≧2, to thereby generate at least one additional beam wherein the sum of the input and additional beams is M, wherein $$\sum_{i=1}^{M} S_{mi}\omega_i = 0$$

for each nonlinear frequency conversion process m, wherein i denotes a particular beam of the M beams, $\omega_i$ denotes the frequency of a beam i, wherein $S_{mi}$ is +1, 0 or −1; and
    b) a telescope subassembly having an ABCD matrix with matrix coefficients substantially A=−1, B has any real value, substantially C=0 and substantially D=−1, for receiving and coupling the input and additional beams emitted from the nonlinear medium after a pass number J, back into the medium for a pass number J+1, where 1≦J<N, and wherein the additional beam issues from the nonlinear medium after pass number J+1.

2. Apparatus for the nonlinear frequency conversion of optical radiation, the apparatus comprising:
    a) an optically nonlinear medium that receives at least one input beam wherein each of said at least one beam makes N passes through the nonlinear medium, wherein each pass is spatially separate from all preceding passes, where N is an integer≧2, to thereby generate at least one additional beam wherein the sum of the input and additional beams is M wherein $$\sum_{i=1}^{M} S_{mi}\omega_i = 0$$

for each nonlinear frequency conversion process m, wherein I denotes a particular beam of the M beams, $\omega_i$ denotes the frequency of a beam I, wherein $S_{mi}$ is +1, 0 or −1, and
    b) at least one phasor for receiving and adjusting a relative phase of the M beams before a pass number K of the beams through the medium, where 2≦K≦N.

3. The apparatus of claim 2 wherein the optical dispersion of at least one phasor is adjustable.

4. Apparatus for the nonlinear conversion of optical radiation, the apparatus comprising:
    a) an optically nonlinear medium that receives at least one input beam wherein each of said at least one beam makes N passes through the nonlinear medium, wherein each pass is spatially separate from all preceding passes, where N is an integer≧2, to thereby generate at least one additional beam wherein the sum of the input and additional beams is M, wherein $$\sum_{i=1}^{M} S_{mi}\omega_i = 0$$

for each nonlinear frequency conversion process m, wherein I denotes a particular beam of the M beams, $\omega_i$ denotes the frequency of a beam i, wherein $S_{mi}$ is +1, 0 or −1, and
    b) a telescope subassembly having an ABCD matrix with matrix coefficients substantially A=−1, B has any real value, substantially C=0 and substantially D=−1, for receiving and coupling the input and additional beams, emitted from the nonlinear medium after a pass number J, back into the medium for a pass number J+1, where 1≦J<N and wherein the additional beam issues from the nonlinear medium after pass number J+1; and
    c) at least one phasor for receiving and adjusting a relative phase of the M beams before a pass number K of the beams though the medium, where 2≦K≦N, where the phasor is positioned between the nonlinear medium and the telescope subassembly.

5. The apparatus of claim 4, wherein the optical dispersion of at least one phasor is adjustable.

6. Apparatus for the nonlinear conversion of optical radiation, the apparatus comprising:
    a) an optically nonlinear medium that receives at least one input beam wherein each of said at least one beam makes N passes through the nonlinear medium, wherein each pass is spatially separate from all preceding passes, where N is an integer≧2, to thereby generate at least one additional beam wherein the sum of the input and additional beams is M, wherein $$\sum_{i=1}^{M} S_{mi}\omega_i = 0$$

for each nonlinear frequency conversion process m, wherein i denotes a particular beam of the M beams, $\omega_i$ denotes the frequency of a beam i, wherein $S_{mi}$ is +1, 0 or −1, wherein M>3 and b) a telescope subassembly having an ABCD matrix with matrix coefficients substantially A=−1, B has any real value, substantially C=0 and substantially D=−1, for receiving and coupling the input and additional beams, emitted from the nonlinear medium after a pass number J, back into the medium for a pass number J+1, where 1≦J<N and wherein the additional beam issues from the nonlinear medium after pass number J+1.

7. Apparatus for frequency-doubling optical radiation, the apparatus comprising:
a) an optically nonlinear medium that receives a first beam of optical radiation having a first frequency, wherein the first beam makes N passes through the nonlinear medium, wherein the each pass is spatially separate from all preceding passes, where N is an integer≧2, to thereby generate a second beam having a second frequency substantially equal to twice the first frequency; and
b) a wedged phasor for adjusting a relative phase of the first and second beams before a pass number K of the beams through the medium, where 2≦K≦N.

8. Apparatus for frequency-doubling optical radiation, the apparatus comprising:
a) an optically nonlinear medium that receives a first beam of optical radiation having a first frequency, wherein the first beam makes N passes through the nonlinear medium between a first face and a second face of the medium, wherein each pass is spatially separate from all preceding passes, where N is an integer≧2, to thereby generate a second beam having a second frequency substantially equal to twice the first frequency;
b) a first telescope subassembly having a first ABCD matrix with matrix coefficients substantially A=−1, substantially C=0 and substantially D=−1, for receiving and coupling the first and second beams, emitted from the medium after a pass number J, back into the medium for a pass number J+1, where 1≦J<N, wherein the second beam issues from the nonlinear medium after pass number J+1; and
c) a wedged phasor for adjusting a relative phase of the first and second beams before a pass number K of the beams though the medium, where 2≦K≦N, where the phasor is positioned between the nonlinear medium and the telescope subassembly.

9. The apparatus of claim 8, wherein a reference plane within said nonlinear medium is substantially re-imaged onto itself with negative unity magnification by said telescope subassembly, and wherein the reference plane is substantially perpendicular to a direction of propagation of said first and second beams.

10. The apparatus of claim 9, wherein said first beam is substantially a Gaussian beam having a beam waist with a 1/e amplitude radius w that is related to a distance L between said first and second faces according to $L_{opt}/3 < L < 3 L_{opt}$, where $L_{opt} = 5.687\pi w^2 n_\omega/\lambda$, $n_{1\omega}$ is an index of refraction of said nonlinear medium at said first frequency, and λ is a free space wavelength of said first beam, and wherein the beam waist is substantially located on said reference plane and said reference plane is substantially centered between said first and second faces.

11. The apparatus of claim 10, wherein said distance L is substantially equal to $L_{opt}$.

12. The apparatus of claim 8, wherein said nonlinear medium is birefringently phase-matched.

13. The apparatus of claim 8, wherein said nonlinear medium is quasi-phase-matched.

14. The apparatus of claim 13, wherein said nonlinear medium comprises periodically-poled Potassium Titanyl Phosphate ($KTiOPO_4$), periodically-poled Lithium Niobate ($LiNbO_3$), or periodically-poled Lithium Tantalate ($LiTaO_3$).

15. The apparatus of claim 8, wherein said first and second beams pass through said wedged phasor at an angle substantially equal to Brewster's angle and wherein said beams are incident on a face of said wedged phasor with substantially p polarization.

16. The apparatus of claim 8, wherein said nonlinear medium is substantially a parallelepiped having a center line intersecting centers of said first and second medium faces, the apparatus further comprising a second telescope subassembly having a second ABCD matrix with matrix coefficients substantially A=−1, B has any real value, substantially C=0 and substantially D=−1, wherein said first telescope subassembly has a first axis which is substantially collinear with the center line, wherein the second telescope subassembly has a second axis which is parallel to and spaced apart from the center line, and wherein a plane containing the first axis and the second axis is substantially parallel to a face of the parallelepiped.

17. The apparatus of claim 8, further comprising means for astigmatism compensation for at least one of said first telescope subassembly and said phasor.

18. The apparatus of claim 8, further comprising means for ensuring collinearity of said second beam with said first beam for at least one of said passes through said nonlinear medium.

19. A method for frequency-doubling optical radiation, the method comprising:
a) transmitting a first beam of optical radiation having a first frequency of through an optically nonlinear medium so that the first beam makes N passes through the nonlinear medium, wherein each pass is spatially separate from all preceding passes, where N is an integer≧2, to thereby generate a second beam having a second frequency $\omega_2$ substantially equal to twice the first frequency; and
b) passing the first and second beams, emitted from the medium after a pass number J, through a telescope subassembly having an ABCD matrix with matrix coefficients substantially A=−1, B has any real value, substantially C=0 and substantially D=−1, whereby the first and second beams are coupled back into the medium for a pass number J+1, where 1≦J<N and wherein the second beam issues from the nonlinear medium after pass number J+1.

20. A method for frequency-doubling optical radiation, the method comprising:
a) transmitting a first beam of optical radiation having a first frequency $\omega_1$ through an optically nonlinear medium so that the first beam makes N passes through the nonlinear medium, wherein each pass is spatially separate from all preceding passes, where N is an integer≧2, to thereby generate a second beam having a second frequency $\omega_2$ substantially equal to twice the first frequency; and b) passing the first and second beams through a wedged phasor for adjusting a relative phase of the first and second beams before a pass number K of the beams through the nonlinear medium, where $2 \leq K \leq N$.

21. A method for frequency-doubling optical radiation, the method comprising:

a) transmitting a first beam of optical radiation having a first frequency $\omega_1$ through an optically nonlinear medium so that the first beam makes N passes through the nonlinear medium between a first face and a second face of the medium, wherein each pass is spatially separate from all preceding passes, where N is an integer≧2, to thereby generate a second beam having a second frequency $\omega_2$ substantially equal to twice the first frequency;

b) passing the first and second beams, emitted from the medium after a pass number J, through a first telescope subassembly having a first ABCD matrix with matrix coefficients substantially A=−1, B has any real value, substantially C=0 and substantially D=−1, whereby the first and second beams are coupled back into the medium for a pass number J+1, where $1 \leq J < N$; and c) passing the first and second beams through a wedged phasor for adjusting a relative phase of the first and second beams before a pass number K of the beams through the nonlinear medium, where $2 \leq K \leq N$, where the phasor is positioned between the nonlinear medium and the telescope subassembly where the second beam issues from the. nonlinear medium after pass number J+1.

22. The method of claim 21, wherein a reference plane within the nonlinear medium is substantially re-imaged onto itself with negative unity magnification by said telescope subassembly, and wherein the reference plane is substantially perpendicular to a direction of propagation of said first and second beams.

23. The method of claim 22, wherein said first beam is substantially a Gaussian beam having a beam waist with a 1/e amplitude radius w that is related to a distance L between said first and second faces according to $L_{opt}/3 < L < 3 L_{opt}$, where $L_{opt} = 5.687 \pi w^2 n_\omega / \lambda$, $n_\omega$ is an index of refraction of said nonlinear medium at said first frequency, and $\lambda$ is a free space wavelength of said first beam, and wherein the beam waist is substantially located on said reference plane.

24. The method of claim 23, wherein said distance L is substantially equal to $L_{opt}$.

25. The method of claim 21, wherein said nonlinear medium is birefringently phase-matched.

26. The method of claim 21, wherein said nonlinear medium is quasi-phase-matched.

27. The method of claim 26, wherein said nonlinear medium comprises periodically-poled Potassium Titanyl Phosphate (KTiOPO$_4$), periodically-poled Lithium Niobate (LiNbO$_3$) or periodically-poled Lithium Tantalate (LiTaO$_3$).

28. The method of claim 21, wherein said first and second beams pass through said wedged phasor at an angle substantially equal to Brewster's angle and wherein said beams are incident on a face of said wedged phasor with substantially p polarization.

29. The method of claim 21, wherein said nonlinear medium is substantially a parallelepiped having a center line intersecting centers of said first and second medium faces, the method further comprising passing said first and second beams through a second telescope subassembly having a second ABCD matrix with matrix coefficients substantially A=−1, B has any real value, substantially C=0 and substantially D=−1, wherein said first telescope subassembly has a first axis which is substantially collinear with the center line, wherein the second telescope subassembly has a second axis which is parallel to and spaced apart from the center line, and wherein a plane containing the first axis and the second axis is substantially parallel to a face of the parallelepiped.

30. The method of claim 21, further comprising compensating for the astigmatism of at least one of said telescope subassembly and said phasor.

31. The method of claim 21, further comprising ensuring collinearity of said second beam with said first beam for at least one of said passes through said nonlinear medium.

* * * * *